United States Patent
Thomas et al.

(10) Patent No.: US 10,789,068 B2
(45) Date of Patent: Sep. 29, 2020

(54) SYSTEM AND METHOD FOR VERIFYING SEQUENCE OF INSTRUCTIONS OF SOFTWARE

(71) Applicant: Ripple Luxembourg S.A., Luxembourg (LU)

(72) Inventors: Stefan Thomas, San Francisco, CA (US); Evan Schwartz, San Francisco, CA (US)

(73) Assignee: RIPPLE LABS INC., San Francisco, CA (US)

( * ) Notice: Subject to any disclaimer, the term of this patent is extended or adjusted under 35 U.S.C. 154(b) by 289 days.

(21) Appl. No.: 15/873,737

(22) Filed: Jan. 17, 2018

(65) Prior Publication Data

US 2018/0157487 A1 Jun. 7, 2018

Related U.S. Application Data

(63) Continuation of application No. 14/733,232, filed on Jun. 8, 2015, now Pat. No. 9,904,544.

(51) Int. Cl.
| | |
|---|---|
| *G06F 8/77* | (2018.01) |
| *G06F 8/61* | (2018.01) |
| *G06Q 30/00* | (2012.01) |
| *G06Q 40/04* | (2012.01) |

(52) U.S. Cl.
CPC .................. *G06F 8/77* (2013.01); *G06F 8/61* (2013.01); *G06Q 30/00* (2013.01); *G06Q 40/04* (2013.01)

(58) Field of Classification Search
CPC .. G06F 8/77; G06F 8/61; G06Q 30/00; G06Q 40/04
See application file for complete search history.

(56) References Cited

U.S. PATENT DOCUMENTS

| | | | |
|---|---|---|---|
| 6,173,446 B1* | 1/2001 | Khan | G06F 21/10 709/203 |
| 2002/0078401 A1* | 6/2002 | Fry | G06F 11/2268 714/30 |
| 2003/0061487 A1* | 3/2003 | Angelo | G06F 21/565 713/176 |
| 2003/0120754 A1 | 6/2003 | Muto et al. | |
| 2005/0065811 A1 | 3/2005 | Chu et al. | |
| 2006/0031686 A1 | 2/2006 | Atallah et al. | |
| 2008/0228784 A1* | 9/2008 | Dempsey | G06F 9/30021 |

(Continued)

OTHER PUBLICATIONS

"Codius—Open-source Hosting Platform for Smart Programs", https://www.codius.org/; retrieved Jun. 8, 2015, 1 Page.

(Continued)

*Primary Examiner* — Viva Miller
(74) *Attorney, Agent, or Firm* — Butzel Long

(57) ABSTRACT

In a method for executing software, a result produced from an execution of a copy of the software by a corresponding platform can be received from each of a plurality of platforms. A number of results of execution of the software can be determined. The extent to which the results match can be compared to a threshold. The matching results can be accepted as an agreed-upon output of the software when the extent to which the results match is equal to or greater than the threshold. The software can include an implementation of at least a portion of an act associated with an agreement between at least two entities.

18 Claims, 19 Drawing Sheets

(56) References Cited

U.S. PATENT DOCUMENTS

| | | | |
|---|---|---|---|
| 2010/0161566 A1 | 6/2010 | Adair et al. | |
| 2011/0047620 A1 | 2/2011 | Mahaffey et al. | |
| 2011/0258313 A1 | 10/2011 | Mallik et al. | |
| 2012/0265761 A1 | 10/2012 | Atsmon et al. | |
| 2013/0204880 A1 | 8/2013 | Lesiecki et al. | |
| 2015/0121463 A1* | 4/2015 | Anderson | H04L 63/12 726/4 |
| 2015/0295872 A1* | 10/2015 | Hawryluk | G06F 21/6245 715/752 |
| 2015/0378872 A1 | 12/2015 | Kim | |
| 2016/0203313 A1* | 7/2016 | El-Moussa | G06F 8/65 726/23 |
| 2016/0328713 A1* | 11/2016 | Ebrahimi | H04L 9/3066 |
| 2017/0134162 A1* | 5/2017 | Code | G06F 21/10 |
| 2019/0332776 A1* | 10/2019 | Gomez | G06F 8/63 |

OTHER PUBLICATIONS

"Contract Wex Legal Dictionary", Cornell University Law School; https://www.law.cornell.edu/wex/contract; retrieved Jun. 8, 2015, 5 Pages.

"Ed25519: high-speed high-security signatures", Available at http://ed25519.cr.yp.to/; retrieved Jun. 8, 2015, Sep. 27, 2011, 2 Pages.

"EdDSA", Available at http://en.wikipedia.org/wiki/EdDSA; retrieved Jun. 8, 2015, 3 Pages.

"Elliptic Curve Digital Signature Algorithm", Available at https://en.bitcoin.it/wiki/Elliptic_Curve_Digital_Signature_Algorithm; retrieved Jun. 8, 2015, 1 Page.

"Elliptic Curve Digital Signature Algorithm", Available at http://en.wikipedia.org/wiki/Elliptic_Curve_Digital_Signature_Algorithm; retrieved Jun. 8, 2015, 5 Pages.

"Google Native Client", Available at http://en.wikipedia.org/wiki/Google_Native_Client; retrieved Jun. 8, 2015, 6 Pages.

"Public-key cryptography", Available at http://en.wikipedia.org/wiki/Public-key_cryptography; retrieved Jun. 8, 2015, 14 Pages.

"Schnorr signature", Available at http://en.wikipedia.org/wiki/Schnorr_signature; retrieved Jun. 8, 2015, 3 Pages.

"Smart contract", Available at http://en.wikipedia.org/wiki/Smart_contract; retrieved Jun. 8, 2015, 3 Pages.

"Threshold cryptosystem", Available at https://en.wikipedia.org/wiki/Threshold_cryptosystem; retrieved Jun. 8, 2015, 2 Pages.

Chen, "Secure Threshold Elliptic Curve Digital Signature Algorithm", National Taiwan University of Science and Technology, Oct. 13, 2005, 31 Pages.

Cousins, "2 of 2 ECDSA signing—draft", Mar. 10, 2014, 4 Pages.

Goldfeder, et al., "Securing Bitcoin wallets via threshold signatures", cs.princeton.edu, 11 Pages.

Ibrahim, et al., "A Robust Threshold Elliptic Curve Digital Signature Providing a New Verifiable Secret Sharing Scheme", Circuits and Systems, 2003 IEEE 46th Midwest Symposium on (vol. 1), Dec. 30, 2003, pp. 276-280, Cairo.

Liu, "Curves with a Twist", Available at https://ripple.com/uncategorized/curves-with-a-twist/, Jun. 26, 2014, 11 Pages.

Szabo, "Formalizing and Securing Relationships on Public Networks", Available at http://firstmonday.org/ojs/index.php/fm/article/view/548/469, Sep. 1, 1997, 26 Pages.

Thomas, et al., "Smart Oracles: A Simple, Powerful Approach to Smart Contracts", https://github.com/codius/codius/wiki/SmartOracles:-A-Simple,-Powerful-Approach-to-Smart-Contracts; retrieved Jun. 8, 2015, 16 Pages.

Supreme Court of the United States; *Alice Corporation Pty. Ltd.* v. *CLS Bank International et al.*; Certiorari to the United States Court of Appeals for the Federal Circuit; No. 13-298. Argued Mar. 31, 2014—Decided Jun. 19, 2014.

United States Court of Appeals for the Federal Circuit; *Amdocs (Israel) Limited* v. *Openet Telecom, Inc., Openet Telecom Ltd.* Defendants-Appellees; 2015-1180; Appeal from the United States District Court for the Eastern District of Virginia in No. 1:10-cv-00910-LMBTRJ, Judge Leonie M. Brinkema; Decided: Nov. 1, 2016.

United States Court of Appeals for the Federal Circuit; *Smartgene, Inc.* v. *Advanced Biological Laboratories, SA, and ABL Patent Licensing Technologies, SARL*; 2013-1186; Appeal from the United States District Court for the District of Columbia in No. 08-CV-0642, Judge Beryl A. Howell; Decided: Jan. 24, 2014.

* cited by examiner

SYSTEM AND METHOD FOR VERIFYING SEQUENCE OF INSTRUCTIONS OF SOFTWARE

CROSS-REFERENCE TO RELATED APPLICATIONS

This application is a continuation of U.S. application Ser. No. 14/733,232, filed Jun. 8, 2015, the contents of which are incorporated by reference herein in their entirety.

BACKGROUND

Agreements between entities, such as persons and businesses, underpin a wide variety of transactions, particularly in commercial settings. Agreements that create legally enforceable obligations are known as contracts. A smart contract is a machine that facilitates implementation of at least a portion of an act associated with an agreement between entities. For example, a vending machine can be a realization of a smart contract between a purchaser and an owner of the merchandise inside the vending machine. A smart contract can also be realized using computer hardware, software, or a combination of both. Because portions of acts associated with agreements between entities can be automated by computerized systems, advocates of smart contracts believe that the transactional costs of smart contracts may be less than the transactional costs of traditional contracts.

Another example of a smart contract is a starter interrupt device, which allows a lender at a remote location to disable an automobile whose owner is late making a payment on a loan. More generally, aspects of smart contracts can be found in computer-implemented systems and software that provide quality of service mechanisms associated with service level agreements for packet switched computer networks, automated digital rights management for copyright licenses, cryptographic systems such as those that are often used for financial transactions, and automated enforcement mechanisms in peer-to-peer file sharing networks.

SUMMARY

Aspects disclosed herein relate generally to systems and methods for executing software, and particularly to systems and methods for executing software that includes a smart contract.

An exemplary aspect can be directed to a method for executing software. A result produced from an execution of a copy of the software by a corresponding platform can be received from each of a plurality of platforms. A number of matching results of execution of the software can be determined. Whether the number of matching results is equal to or greater than a threshold can be determined. The matching results can be accepted as an agreed-upon output of the software in response to the number of the matching results being equal to or greater than the threshold. The software can include an implementation of at least a portion of an act associated with an agreement between at least two entities.

Another exemplary aspect can be directed to a device for causing software to be executed. The system can include communication circuitry, a memory, a processor, and a bus. The communication circuitry can be configured to receive, from each of a plurality of platforms, a result produced from an execution of a copy of the software by a corresponding platform. The memory can be configured to store results from the plurality of platforms. The processor can be configured to determine a number of matching results of execution of the software and to determine that the number of the matching results is equal to or greater than the first threshold. The bus can be coupled to the communication circuitry, the memory, and the processor.

Yet another exemplary aspect can be directed to a non-transitory computer-readable storage medium. The storage medium can include instructions that, if executed by one or more processors of a computing system, can cause the computing system to perform operations to execute software. The operations can include receiving, from each of a plurality of platforms, a result produced from an execution of a copy of the software by a corresponding platform. The operations can include determining a number of matching results of execution of the software. The operations can include determining that the number of the matching results is equal to or greater than a threshold.

Additional features, advantages, and aspects of the disclosed subject matter may be set forth or apparent from consideration of the following detailed description, drawings, and claims. Moreover, it is to be understood that both the foregoing summary and the following detailed description are illustrative and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate aspects of the disclosed subject matter and together with the detailed description serve to explain the principles of aspects of the disclosed subject matter. No attempt is made to show structural details in more detail than may be necessary for a fundamental understanding of the disclosed subject matter and various ways in which it may be practiced.

DETAILED DESCRIPTION

Aspects disclosed herein relate generally to systems and methods for executing software, and particularly to systems and methods for executing software that includes a smart contract.

Systems and techniques disclosed herein allow for software to be executed by multiple platforms, referred to as "smart oracles," to execute or to provide support for execution of a smart contract. In general, a smart oracle as disclosed herein can refer to a computer platform configured to receive, from a source trusted by parties to the smart contract, information about an existence of a condition relevant to a result of the smart contract. In addition, a smart oracle as disclosed herein can refer to a computer platform configured to execute the software that includes the smart contract. As an example, two parties to a smart contract may desire the smart contract, or a portion of the smart contract, to be executed by a third party. Each of the two parties to the smart contract may want some assurance that the third party is neutral, cannot tamper with the software that includes the smart contract, and/or cannot be influenced by the other party to the smart contract or by outside entities.

Figure 1:
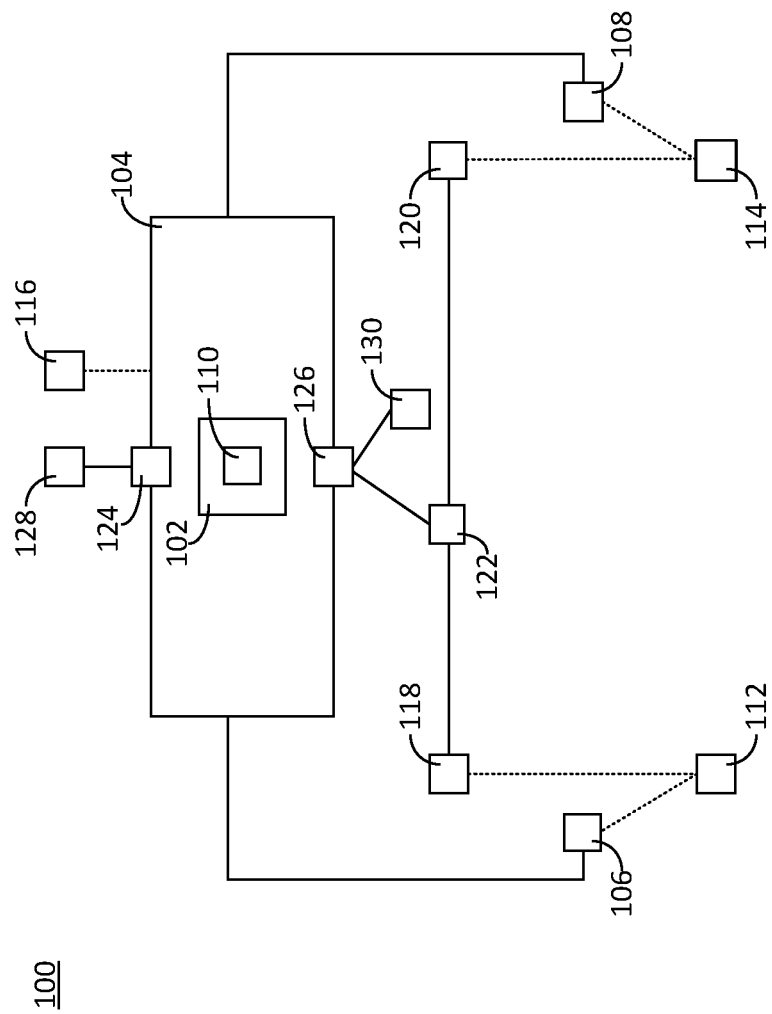
FIG. 1 is a diagram illustrating an example of a system in which software can be executed.

FIG. 1 is a diagram illustrating an example of a system 100 in which software 102 can be executed. The system 100 can include a platform 104, a first device 106, and a second device 108. The platform 104 can be configured to execute the software 102. In an aspect, the software 102 can include a smart contract 110. The first device 106 can be associated with or controlled by a first entity 112. The second device 108 can be associated with or controlled by a second entity 114. The platform 104 can be associated with or controlled by a third entity 116. In an aspect, the smart contract 110 can be an implementation of at least a portion of an act associated with an agreement between the first and the second entities 112, 114. In the system 100, the first and the second entities 112, 114 can entrust the third entity 116 to execute, on the platform 104, the software 102 that includes the smart contract 110 and can agree to abide by a result produced from an execution of the software 102 that includes the smart contract 110. The smart contract 110 can include an agreement between the first and the second entities 112, 114 that can involve a transfer of value such as, for example, an asset, a service, refraining from engaging in an allowed activity, or any combination thereof. The asset can be tangible such as, for example, a good, money, and the like. The asset can also be intangible such as, for example, a share of stock, a bond, an ownership interest, a derivative, a future, an option, a swap, a contract, a lease, a license, intellectual property, digital currency, cryptocurrency, virtual currency, and the like.

By way of example and not by way of limitation, the agreement between the first and the second entities 112, 114 can include a derivative contract that can involve a transfer of value from one of the entities 112, 114 to another of the entities 112, 114 in response to a result of an underlying condition. By way of example and not by way of limitation, the underlying condition can be a sum of heating degree days (HDDs) over a period of time. For example, a HDD can be a number of degrees that an average temperature of a day in a designated area is greater than 65° F. (18° C.). For example, if the sum of the HDDs over the period of time is greater than an agreed-upon threshold, then the value can be transferred from the first entity 112 to the second entity 114; if the sum of the HDDs over the period of time is less than the agreed-upon threshold, then the value can be transferred from the second entity 114 to the first entity 112. In this example, the acts associated with the agreement between the first and the second entities 112, 114 that can be implemented by the smart contract 110 can include a determination of an existence of a condition relevant to the result of the agreement (e.g., the sum of the HDDs over the period of time), a performance by payment (e.g., causing the value to be transferred to one of the first and the second entities 112, 114 in response to the sum of HDDs over the period of time), and a determination of actions associated with contingencies (e.g., no value transferred in the event of the sum of the HDDs over the period of time being equal to the agreed-upon threshold, etc.) In this example, the first entity 112 can be associated with or control a first account 118, the second entity 114 can be associated with or control a second account 120, and the third entity 116 can be associated with or control a third account 122. In this example, prior to the period of time, the first entity 112 can cause the value to be transferred from the first account 118 to the third account 122 and the second entity 114 can cause the value to be transferred from the second account 120 to the third account 122. (Alternatively, the first account 118 can be associated with or controlled by an entity different from the first entity 112, the second account 120 can be associated with or controlled by an entity different from the second entity 114, or both.) In this example, the platform 104 can include a first interface 124, through which the smart contract 110 can receive the HDD for each day of the period, and a second interface 126, through which the smart contract 110 can cause, in response to the sum of the HDDs over the period of time, the value in the third account to be transferred to the first account 118 (e.g., if the sum of the HDDs over the period of time is less than the agreed-upon threshold) or to the second account 120 (e.g., if the sum of the HDDs over the period of time is greater than the agreed-upon threshold).

In this example, the system 100 can optionally include a sensor 128 (e.g., a thermocouple). The sensor 128 can be coupled to the first interface 124 and can be used to provide the temperature in the designated area. In this example, the temperature in the designated area can be processed by the smart contract 110 to determine the HDD and to determine the sum of the HDDs over the period of time (e.g., the determination of the condition relevant to the result of the agreement).

By way of example and not by way of limitation, the agreement between the first and the second entities 112, 114 can include an option contract that can involve a transfer of value from the first entity 112 to the second entity 114 in response to a result of an underlying condition. For example, the first entity 112 can be a business entity and the second entity 114 can be a chief executive officer of the business entity. Traditionally, such an option contract between the business entity and the chief executive officer can allow the chief executive officer to purchase shares of stock of the business entity for a set price (i.e., exercise the option) at any time, at the discretion of the chief executive officer, within a set period of time. Such an option contract has been understood to provide an incentive to the chief executive officer to perform acts to increase the price of the stock of the business entity to the benefit of both the shareholders of the business entity and the chief executive officer. However, in a case in which the stock of the business entity is publicly traded, the exercise of the option is an event that must be made known to the public through a report filed with the Securities and Exchange Commission. Unfortunately, information that the chief executive officer has exercised an option can have the detrimental effect of being perceived by members of the public that own shares of stock of the business entity as an indication that they should sell their shares of stock (e.g., based on the belief that the chief executive officer would exercise the option at a time in which the chief executive officer believed that the price of the stock was at a highest point that the price would reach within the set period of time). Additionally, having such an option contract based solely upon the price of the stock of the business entity can encourage the chief executive officer to perform acts that increase the price of the stock to the detriment of other aspects of the business entity.

Use of the smart contract 110 can address the concerns associated with the traditional use of such an option contract at least by: (1) using a collection of underlying conditions, rather than solely the price of the stock of the business entity, and (2) causing the exercise of the option to be performed automatically upon satisfying all of the underlying conditions, rather than at the discretion of the chief executive officer. By way of example and not by way of limitation, the collection of underlying conditions can be: (1) the stock of the business entity having a value greater than X, (2) the debt to equity ratio of the business entity having a value less than Y, (3) the current ratio of the business entity having a value greater than Z, and (4) the product manufactured by the business entity having been certified as satisfying the Energy Star$^{SM}$ specifications for energy efficiency. For example, if all of the underlying conditions are satisfied, then the value can be transferred from the first entity 112 to the second entity 114 by causing shares of stock of the business entity to be purchased for the chief executive officer at the set price. In this example, the platform 104 can include the first interface 124, through which the smart contract 110 can receive information about the underlying conditions from the audited financial statements of the business entity and from information provided by the Environmental Protection Agency, and the second interface 126, through which the smart contract 110 can cause, in response to all of the underlying conditions having been satisfied, the shares of stock of the business entity to be purchased for the chief executive officer at the set price.

The acts associated with the agreement between the first and the second entities 112, 114 that can be implemented in the smart contract 110 are not limited to the determination of the existence of a condition relevant to the result of the agreement (e.g., the sum of the HDDs over the period of time) and the performance by payment (e.g., causing the value to be transferred to one of the first and the second entities 112, 114 in response to the sum of the HDDs over the period of time), but can include, by way of example and not by way of limitation, a determination of a state of performance, an enforcement by payment of liquidated damages for nonperformance, and other acts associated with the agreement between the first and the second entities 112, 114. For example, if the agreement between the first and the second entities 112, 114 involves a periodic transfer of value from the first entity 112 to the second entity 114 in response to a degree of progress of a project in which the second entity 114 paints a building owned by the first entity 112 (or, alternatively, owned by an entity different from the first entity 112), then the first interface 124 can be configured to receive information about the state of performance (e.g., the degree of progress of the project to paint the building).

In this example, the system 100 can optionally include the sensor 128 (e.g., a camera). The sensor 128 can be coupled to the first interface 124 and can be used to provide the information about the state of performance (e.g., the degree of progress of the project to paint the building). In this example, the information can be processed by the smart contract 110 to determine the state of performance. In this example, the system 100 can optionally include an actuator 130. The actuator 130 can be coupled to the second interface 126 and can be used to cause an action relevant to the agreement. For example, the actuator 130 can allow the second entity 114 to unlock the building to gain access to paint the building. In this example, if the agreement between the first and the second entities 112, 114 includes a payment of liquidated damages for nonperformance, then prior to commencement of the agreement, the second entity 114 can cause an amount of money for the liquidated damages to be transferred from the second account 120 to the third account 122, e.g., where the third account 122 can function as an escrow. In this example, if the smart contract 110 determines nonperformance by the second entity 114 (e.g., the second entity 114 has not painted the building or has not progressed in the project to paint the building since the previous periodic transfer of the amount of money), then the smart contract 110 can enforce the agreement by payment of the liquidated damages (e.g., the smart contract 110 can cause an amount of money in the third account 122 to be transferred to the first account 118).

In light of the description above, one of skill in the art understands other acts associated with the agreement between the first and the second entities 112, 114 that can be implemented in the smart contract 110 in various aspects, which are not limited to those explicitly described herein.

As described above, in the system 100, the first and the second entities 112, 114 can entrust the third entity 116 to execute, on the platform 104, the software 102 that includes the smart contract 110 and can agree to abide by the result produced from the execution of the software 102 that includes the smart contract 110. In an aspect, the third entity 116 can be independent of both the first and the second entities 112, 114. However, independence between the third entity 116 and both the first and the second entities 112, 114 would not necessarily preclude collusion between one of the first and the second entities 112, 114 with the third entity 116 to the detriment of the other one of the first and the second entities 112, 114. For example, the first entity 112 could collude with the third entity 116 to alter or to falsify the result produced from the execution of the software 102 to the detriment of the second entity 114. For example, the first entity 112 could collude with the third entity 116 to cause the execution of the software 102 that includes the smart contract 110 to produce an altered or false result to the detriment of the second entity 114. To address this concern, a system as disclosed herein can include multiple platforms in which each platform can execute a copy of the software 102 that includes the smart contract 110. A corresponding result can be produced from the execution of each copy of the software 102 that includes the smart contract 110, and some or all of the results compared among each other to determine the number of matching results provided by the platforms as a whole. If the number of the matching results is equal to or greater than a threshold, then the first and the second entities 112, 114 can agree to abide by the matching results. For example, the entities 112, 114 can agree in advance that a result provided by at least a minimum number of platforms will be accepted as an authoritative result of execution of the software.

Figure 2:
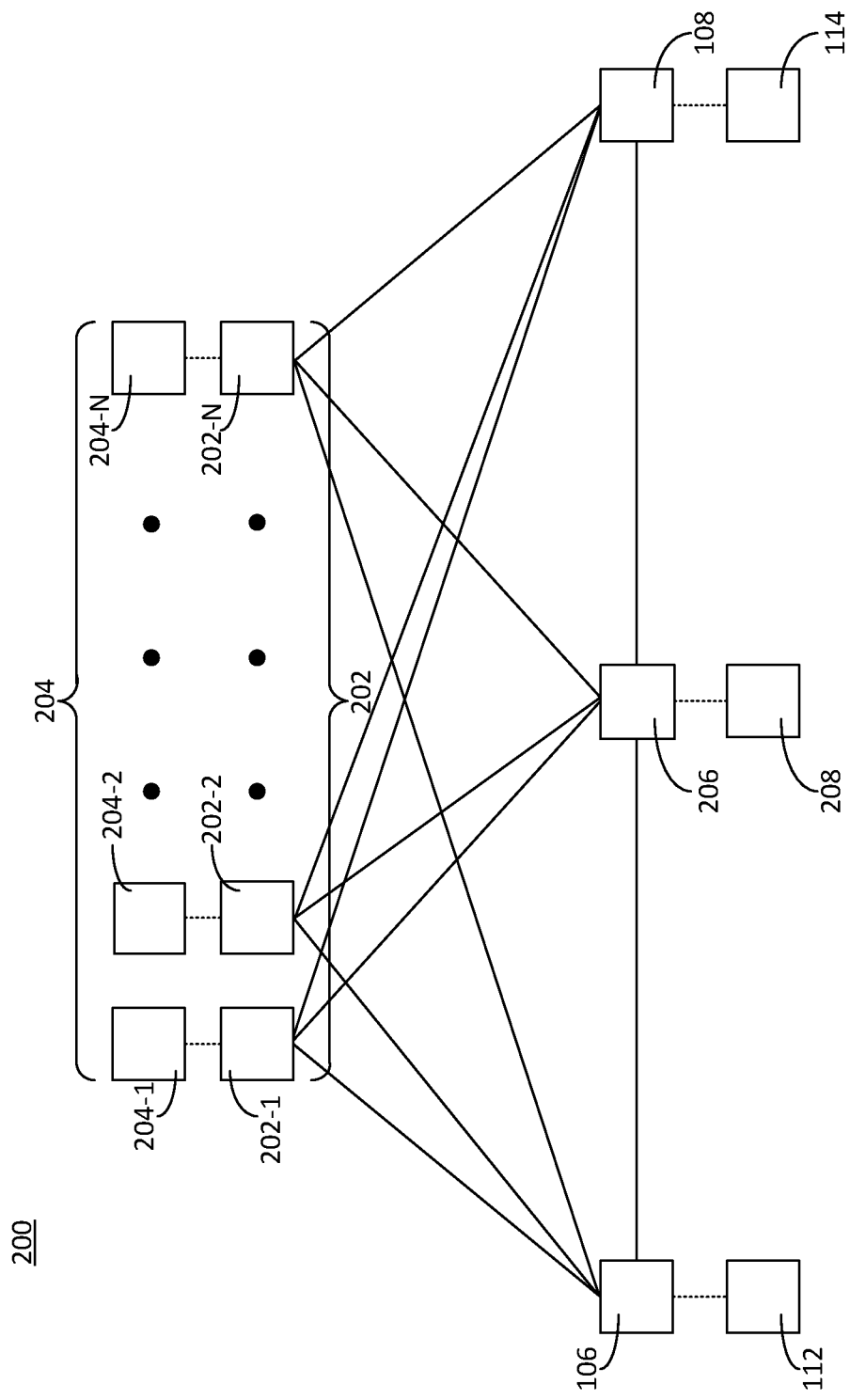
FIG. 2 is a diagram illustrating an example of a system in which software can be executed.

FIG. 2 is a diagram illustrating another example of a system 200 in which the software 102 can be executed. The system 200 can include multiple platforms 202, the first device 106, and the second device 108. The multiple platforms 202 can include, for example, a platform 202-1, and one or more other platforms 202-2, . . . , 202-N. At least one of the platforms 202 can be implemented in a same or similar manner as the platform 104. The platforms 202 can be associated with or controlled by multiple entities 204, typically with each of the platforms 202 associated with or controlled by a corresponding one of the entities 204. For example, the platform 202-1 can be associated with or controlled by an entity 204-1, the platform 202-2 can be associated with or controlled by an entity 204-2, and so on, through platform 202-N, which can be associated with or controlled by an entity 204-N. In an aspect, each of the entities 204 can be independent of each of the other entities 204. In an aspect, each of the entities 204 can be independent of both the first and the second entities 112, 114. Each of the platforms 202 can be configured to execute a copy of the software 102 (not illustrated) that includes the smart contract 110 (not illustrated). A corresponding result can be produced from the execution of each copy of the software 102 that includes the smart contract 110.

As previously indicated, in some cases the number of matching results obtained from different platforms can be determined, for example, to select an agreed-upon result for execution of a particular item of software. In an aspect, the system 200 can include a third device 206. The third device 206 can be configured to receive the corresponding result from each of the platforms 202, to determine the number of the matching results, and to communicate the number of the matching results to the first and the second entities 112, 114. For example, the third device 206 can be associated with a fourth entity 208. In this example, the fourth entity 208 can be independent of each of the entities 204, the first entity 112, and the second entity 114. In an aspect, the third device 206 can be one of the platforms 202. For example, the third device 206 can be the platform 202-1 and the fourth entity 208 can be the entity 204-1. In an aspect, the third device can be one of the first and the second devices 106, 108. For example, the third device 206 can be the first device 106 and the fourth entity 208 can be the first entity 112. In an aspect, the third device 206 can be configured to interact with a cryptographic signature scheme such as, for example, a multiple signature scheme, a threshold signature scheme, the like, or any combination thereof. A threshold signature scheme can involve having a partial cryptographic signature associated with an instance of execution of the software 103, which can be combined to form a full cryptographic signature. In an aspect, the third device 206 can be configured to accept a command signed with a cryptographic signature scheme that interacts with a threshold signature scheme. In an aspect, the third device 206 can be configured to interact with a cryptographic signature scheme regardless of whether the third device 206 receives information about a source of the cryptographic signature.

In an aspect, the number of the matching results can be communicated to the first entity 112 via the first device 106 and to the second entity 114 via the second device 108. Alternatively, the number of the matching results can be communicated to the first and the second entities 112, 114 via a different process.

The first and the second entities 112, 114 can agree to abide by the matching results in response to the number of the matching results being equal to or greater than a threshold. The threshold can be any number. In an aspect, the threshold can be equal to or greater than a majority of the multiple platforms 202.

Because operation of the system 200 can involve the multiple entities 204 and because the first and the second entities 112, 114 can agree to abide by the matching results in response to the number of the matching result being equal to or greater than the threshold, collusion by one of the first and the second entities 112, 114 to the detriment of the other one of the first and the second entities 112, 114 could require a potential wrongdoer to collude with a subset of the entities 204 such that a number of the entities 204 in the subset of the entities 204 could be equal to the threshold. Because the success of a scheme of collusion that involves a large number of entities typically is more difficult to realize than a scheme of collusion that involves a smaller number of entities, compared to the system 100, the system 200 can reduce the likelihood that a scheme of collusion will succeed.

Figure 3:
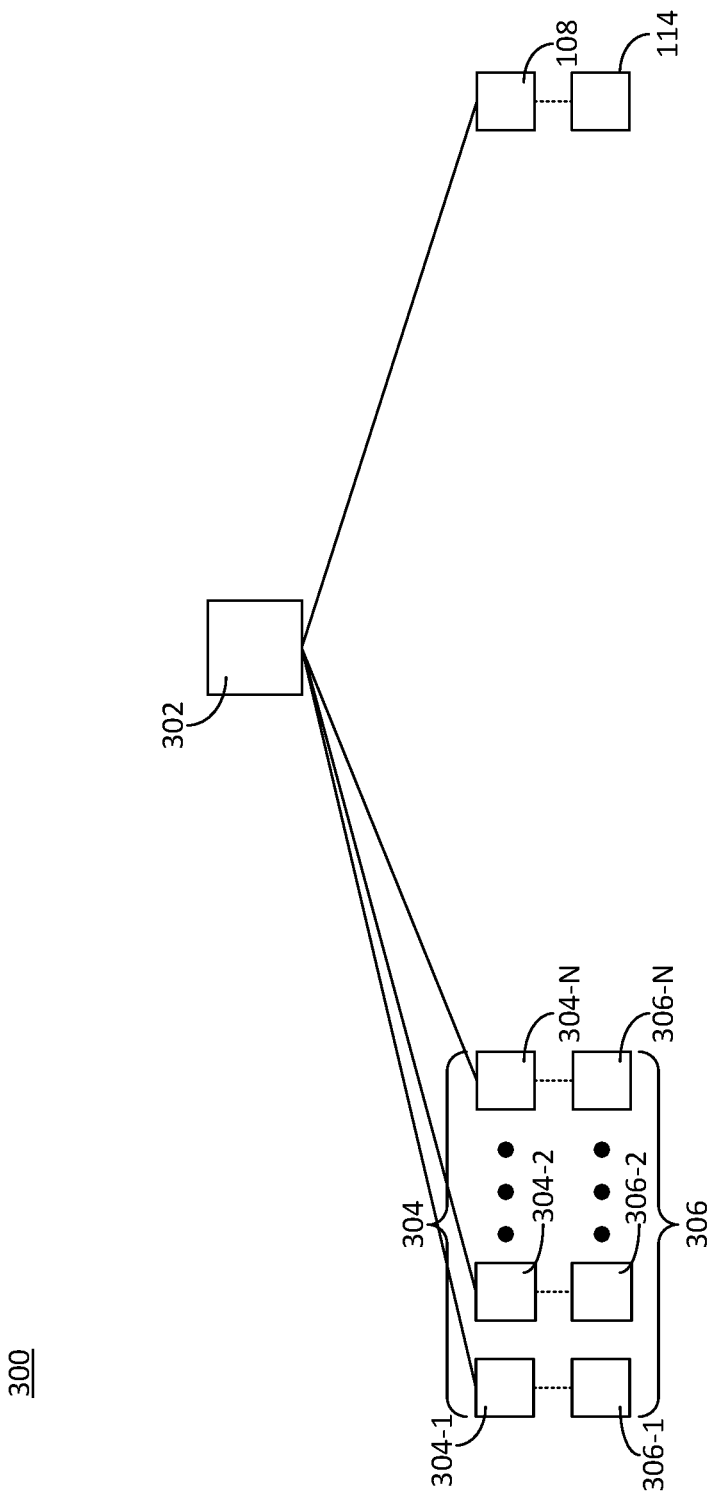
FIG. 3 is a diagram illustrating an example of a system in which software can be executed.

In an aspect, at least one of the first and the second entities 112, 114 can include multiple entities. FIG. 3 is a diagram illustrating still another example of a system 300 in which the software 102 can be executed. The system 300 can include a platform 302, multiple first devices 304, and the second device 108. The platform 302 can be implemented as the platform 104 or the platforms 202. The first devices 304 can include, for example, a first device 304-1, a first device 304-2, and so on, up to any number of first devices 304-N. At least one device of the first devices 304 can be implemented in a same or similar manner as the first device 106. The first devices 304 can be associated with or controlled by corresponding first entities 306. For example, each of the first devices 304 can be associated with or controlled by a corresponding one of the first entities 306. For example, the first device 304-1 can be associated with or controlled by a first entity 306-1, the first device 304-2 can be associated with or controlled by a first entity 306-2, and so on, through the first device 304-N, which can be associated with or controlled by a first entity 306-N. In an aspect, each of the first entities 306 can be independent of each other of the first entities 306. The second device 108 can be associated with or controlled by the second entity 114.

By way of example and not by way of limitation, each of first entities 306 can be an owner of an account with a mobile device service provider, the second entity 114 can be the mobile device service provider, and the agreement can involve a transfer of value from at least one of first entities 306 to the second entity 114 in response to a measure of a quality of service (QoS) metric related to the service provided by the second entity 114 to the at least one of first entities 306. In this example, the value transferred can be a function of the measure of the QoS metric. For example, if the measure of the QoS metric is equal to or greater than a first threshold, then a basic value can be transferred, but if the measure of the QoS metric is equal to or greater than a second threshold, the second threshold being greater than the first threshold, then a value larger than the basic value can be transferred.

Figure 4:
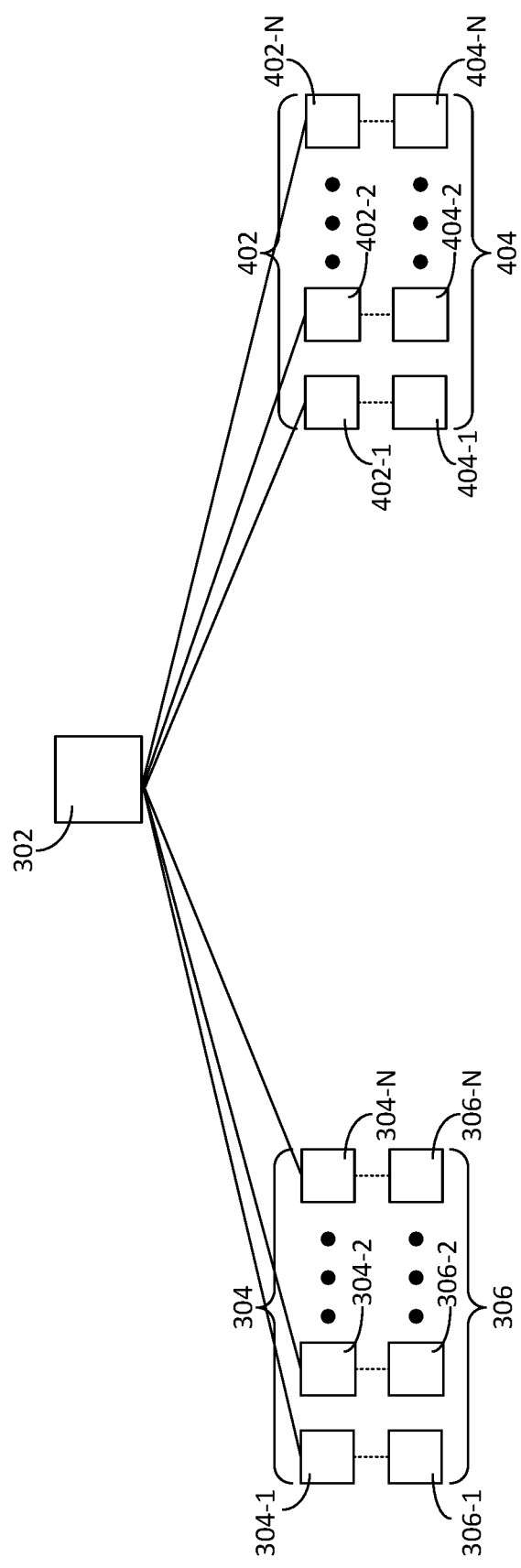
FIG. 4 is a diagram illustrating an example of a system in which software can be executed.

FIG. 4 is a diagram illustrating yet another example of a system 400 in which the software 102 can be executed. The system 400 can include the platform 302, the multiple first devices 304, and multiple second devices 402. The first devices 304 can be associated with or controlled by the entities 306. The platform 302 can be implemented as the platform 104 or the platforms 202. The second devices 402 can include, for example, a second device 402-1, a second device 402-2, and so on, up to any number of second devices 402-N. At least one device of second devices 402 can be implemented in a same or similar manner as the second device 108. The second devices 402 can be associated with or controlled by corresponding second entities 404. For example, each of the second devices 402 can be associated with or controlled by a corresponding one of the second entities 404. For example, the second device 402-1 can be associated with or controlled by a second entity 404-1, the second device 402-2 can be associated with or controlled by a second entity 404-2, and so on through the second device 402-N, which can be associated with or controlled by a second entity 404-N. In an aspect, each of the second entities 404 can be independent of each other of the second entities 404. Continuing the previous example described with respect to FIG. 1, the agreement between the first entities 306 and the second entities 404 can involve a transfer of value from the first entities 306 to the second entities 404 if the sum of the HDDs over the period of time is greater than the agreed-upon threshold and from the second entities 404 to the first entities 306 if the sum of the HDDs over the period of time is less than the agreed-upon threshold.

As described above, the platform 104 can include the first interface 124 through which the smart contract 110 can receive the result of the underlying condition. More generally, the first interface 124 can be configured to receive information about an existence of a condition relevant to a result of an agreement. The information can be provided from a source trusted by the first and the second entities 112, 114 such as, by way of example and not by way of limitation, a wire service. Alternatively or additionally, the information can be provided from the first entity 112, the second entity 114, or both. In an aspect, each of the platforms 202 can include a corresponding first interface. In an aspect, the first interface of each of the platforms 202 can be configured to receive the information from the same source. In an aspect, the first interface of at least one of the platforms 202 can be configured to receive the information from a first source and the first interface of at least one other of the platforms 202 can be configured to receive the information from a second source.

As described above, the system 100 can optionally include the sensor 128. The sensor 128 can be coupled to the first interface 124. The sensor 128 can be the source of the information about an existence of a condition relevant to a result of an agreement. The sensor 128 can be any kind of transducer configured to detect the existence of the condition and to produce a signal in response to a detection of the existence of the condition. The type of the sensor 128 can be a function of the condition whose existence is to be detected. By way of example and not by way of limitation, the sensor 128 can detect visual information (e.g., a camera), electromagnetic energy (e.g., a receiver), acoustic energy (e.g., a microphone), heat (e.g., a thermocouple), pressure such as touch (e.g., tactile sensor), motion (e.g., motion sensor), acceleration (e.g., accelerometer), displacement (e.g., displacement sensor), time (e.g., a clock), location (e.g. a Global Positioning System sensor), humidity, gravity, density (e.g., a hydrometer), electric fields, magnetic fields, the presence and concentration (or changes in the concentration) of one or more chemicals, the like, or any combination thereof. For example, in a case in which the smart contract 110 is directed to a crop insurance contract, the sensor 128 (e.g., a camera) can be used to determine a condition of the crops being insured. For example, in a case in which the smart contract 110 is directed to a sale of crude oil, the sensor 128 (e.g., a hydrometer) can be used to determine an American Petroleum Institute (API) gravity (e.g., a measure of density) of the crude oil. For example, in a case in which the smart contract 110 includes a contract for the first entity 112 to manufacture a system for the second entity 114 such that the system includes a specific component provided to the first entity 114 by the second entity 114, the sensor 128 (e.g., a receiver) can be used to determine that the specific component, to which a radio-frequency identification (RFID) tag has been attached, has been installed in the manufactured system.

In an aspect, the first interface of each of the platforms 202 can be coupled to the same sensor. In an aspect, the first interface of at least one of the platforms 202 can be coupled to a first sensor and the first interface of at least one other of the platforms 202 can be coupled to a second sensor. In an aspect, the first sensor and the second sensor can be disposed to detect the existence of the same condition at the same location. In an aspect, the first sensor can be disposed to detect the existence of the condition at a first location and the second sensor can be disposed to detect the existence of the same or a different condition at a second location. For example, in the case in which the smart contract 110 includes the derivative contract that involves the transfer of value in response to the sum of HDDs over the period of time, the first sensor (e.g., a first thermocouple) can be disposed to detect the temperature at a first location (e.g., a first airport within the designated area) and the second sensor (e.g., a second thermocouple) can be disposed to detect the temperature at a second location (e.g., a second airport within the designated area).

As described above, the platform 104 can include the second interface 126, through which the smart contract 110 can cause, in response to the result of the underlying condition, the value to be transferred. More generally, the second interface 126 can be configured to communicate the result of the smart contract 110.

As described above, the system 100 can optionally include the actuator 130. The actuator 130 can be coupled to the second interface 126. The actuator 130 can be used to cause an action relevant to the agreement. For example, if the agreement between the first and the second entities 112, 114 involves a transfer of value from the first entity 112 to the second entity 114 in response to delivery of a manufactured product from the second entity 114 to the first entity 112, then the actuator 114 can be configured to cause the product to be manufactured, under control of the second entity 114, in response to specifications for the product received from the first entity 112 via the smart contract 110. Likewise, the actuator 114 can be configured to cause the product to be shipped.

Figure 5:
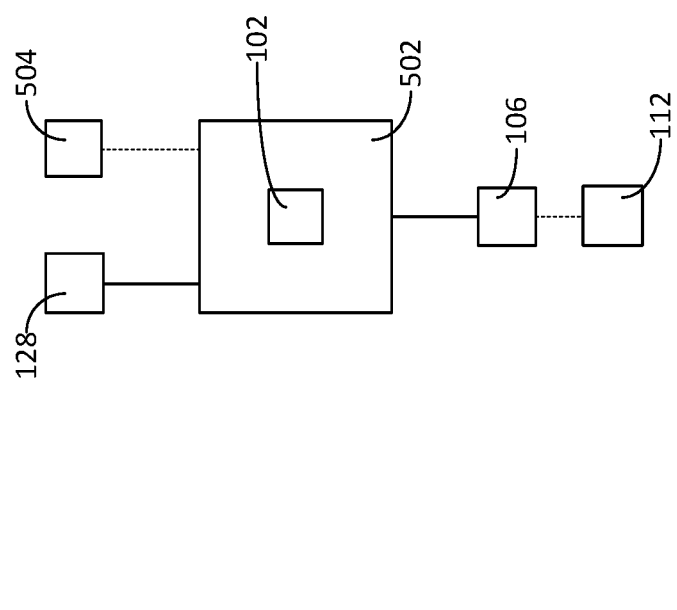
FIG. 5 is a diagram illustrating an example of a system in which software can be executed.

As described above, the software 102 can include the smart contract 110. However, in an aspect, the software 102 may not include a smart contract. FIG. 5 is a diagram illustrating another example of a system 500 in which the software 102 can be executed. The system 500 can include a platform 502 and the first device 106. The platform 502 can be implemented as the platform 104 or the platforms 202. The platform 502 can be configured to execute the software 102, which may not include a smart contract. The first device 106 can be associated with or controlled by the first entity 112. The platform 502 can be associated with or controlled by an entity 504. The entity 504 can be the third entity 116 or the entities 204. In an aspect, the entity 504 can be independent of the first entity 112. By way of example and not by way of limitation, the first entity 112 can be conducting an experiment that uses the software 102 and can value having the software 102 executed under the control of the entity 504 because such control furthers the likelihood that a result of the experiment will be recognized as valid. In an aspect of this example, the system can optionally include the sensor 128. The sensor 128 can be used to detect information relevant to the software 102 and to produce a signal in response to a detection of the information. It can be the situation that it is desirable that the first entity 112 be far from a source of the information, but that the platform 502 be near to the sensor 128 in order to minimize attenuation of the signal prior to the signal being processed by the platform 502. By way of example and not by way of limitation, the first entity 112 can be conducting an experiment that uses the software 102 and can value having the software 102 executed under the control of the entity 504 because such control furthers the likelihood that a result of the experiment will be recognized as valid. In an aspect of this example, the software 102 can include code to implement a nondeterministic simulation algorithm. In this aspect, the first entity 112 can desire to have several platforms of the platform 502 execute copies of the software 102 so that results of execution of the copies of the software 102 can be compared.

Figure 6:
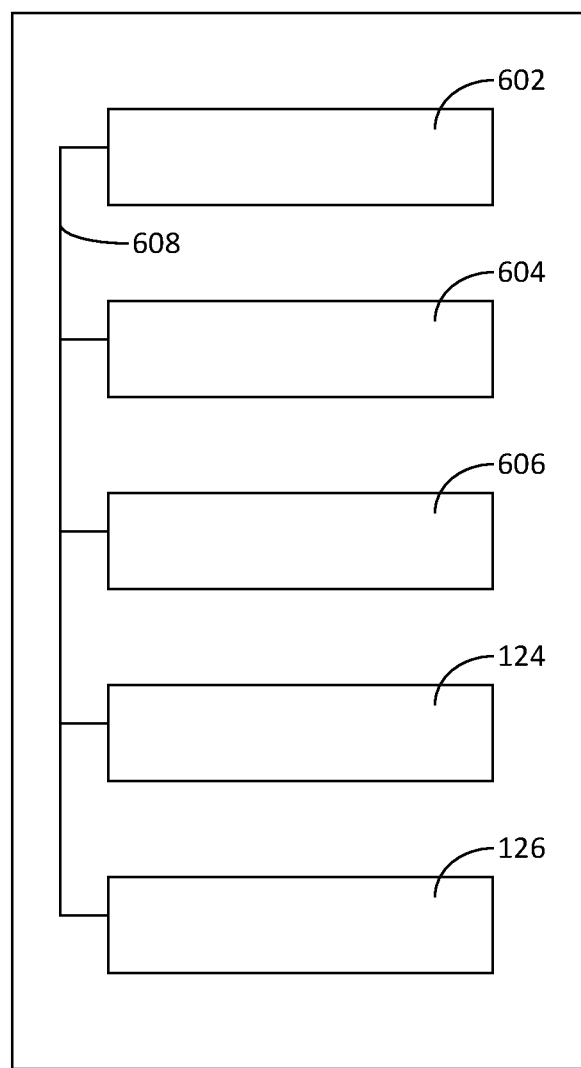
FIG. 6 is a diagram illustrating an example of a platform illustrated in FIGS. 1 through 5.

FIG. 6 is a diagram illustrating an example of a platform 600. The platform 600 can be an implementation of the platform 104 or of one of the platforms 202. The platform 600 can be any type of computer system suitable to execute the software 102 and to communicate with at least one of the first device 106, the second device 108, the third device 206, at least one of the first devices 304, or at least one of the second devices 402. The platform 600 can include a processor 602, a memory 604, communications circuitry 606, the first interface 124, the second interface 126, and a bus 608. The processor 602 can include any processing circuitry operative to control an operation of the platform 600 and to execute the software 102. The memory 604 can include one or more storage media. For example, the memory 604 can include at least one of a hard-drive, a solid state drive, optical drive, floppy disk, flash memory, read-only memory (ROM), random-access memory (RAM), cache memory, a Fibre Channel network, a storage area network (SAN), or any combination thereof. The communications circuitry 606 can provide communications between the platform 600 and devices external to the platform 600. The communications circuitry 606 can be configured to provide communications via a packet switched network, a cellular network, a satellite network, an optical network, a telephone link, the like, or any combination thereof. The communications circuitry 606 can be configured to provide communications in a wired or a wireless manner. The communications circuitry 606 can be configured to perform simultaneously several communications operations using different networks. Optionally, the first and the second interfaces 124, 126 can be implemented as a common interface. The bus 608 can be coupled to the processor 602, the memory 604, the communications circuitry 606, the first interface 124, and the second interface 126, and can be configured to facilitate communication among these components. Other devices and components (not illustrated) can be included in the platform 600. Conversely, in an aspect, all of the components illustrated in FIG. 6 may not need to be included in the platform 600.

In an aspect, components of the platform 600 can be distributed. For example, a first part (not illustrated) of the platform 600 can be separated from a second part (not illustrated) of the platform 600. The first part of the platform 600 can include a first processor, a first memory, a first communications circuitry, the first interface 124, and a first bus. The first part of the platform 600 can be configured to receive information about an existence of a condition relevant to a result of an agreement and to communicate this information to the second part of the platform 600. The second part of the platform 600 can include a second processor, a second memory, a second communications circuitry, the second interface 126, and a second bus. The second part of the platform 600 can be configured to receive the information from the first part of the platform 600, to execute the software 102, and to communicate the result of the smart contract 110. More generally, the platform 600 can be configured as a local or a distributed computing system using any suitable technique.

In an aspect, the platform 600 can be configured to verify a sequence of instructions of the software 102. In an aspect, the software 102 can include the smart contract 110. In an aspect, the sequence of instructions can be verified for each instance of execution of the software 102. For example, once the first and the second entities 112, 114 have agreed on the terms of their agreement, they can translate these terms into the smart contract 110. The first and the second entities 112, 114 can desire to inspect the code of the smart contract 110 to ensure that the logic of the code represents their agreement. Additionally, the first and the second entities 112, 114 can desire to verify the code (e.g., by verifying the sequence of instructions) once the code has been installed on the platform 600.

In an aspect, the sequence of instructions of the software 102 can be verified by producing a hash of the software 102. The hash of the software 102 can be a way to uniquely identify the code of the software 102. For example, the hash of the software 102 can be produced from a collision-resistant hash function, a second preimage resistant hash function, or both.

In an aspect, the sequence of instructions of the software 102 can be verified by receiving a communication that a compilation code, to compile the software 102, has been verified by the first entity 112. (If the software 102 includes the smart contract 110, then the compilation code can also be verified by the second entity 114).

In an aspect, the sequence of instructions of the software 102 can be verified by using a deterministic compilation code to compile the software 102, to ensure that the machine-executable code, produced from the software 102 by the compilation code, represents the agreement. Alternatively, if the software 102 is represented in an interpreted language, then the source code of the software 102 can be installed on the platform 600. For example, such source code can be installed on the platform 600 using a method such as Gitian.

In an aspect, the sequence of instructions of the software 102 can be verified by receiving a communication from a second entity (the second entity being different from the second entity 114 if the software 102 includes the smart contract 110) that the software 102 has been verified by the second entity. The second entity can be different from the first entity 112 (and from the second entity 114 if the software 102 includes the smart contract 110). For example, the second entity can be an entity that developed the software 102 as a module to be used in several instances of execution. For example, the second entity can be an authentication service that verifies one or more digital signatures or hashes associated with the software 102. Such a module can implement basic functionality. Such a module can be used by several smart contracts. A hash of such a module can be used to identify (and to verify the sequence of instructions) of such a module.

In an aspect, the sequence of instructions of the software 102 can be verified by any combination of the foregoing.

In an aspect, the platform 600 can be configured to execute the software 102 by a technique that isolates the software 102 from a resource of the platform 600, limits an ability of the software 102 to perform a function, or both. Control of the platform 600 can be independent of the first entity 112 (and of the second entity 114 if the software 102 includes the smart contract 110). The first entity 112 (and the second entity 114 if the software 102 includes the smart contract 110) can be an entity for which the software 102 is being executed.

In an aspect, the technique can include using a sandbox established by the platform 600. The sandbox can be implemented through a variety of methods that act to constrain the functionality of the software 102. For example, it can be desired that the platform 600 be configured to execute the software 102, which may not only be untrusted, but may also be malicious. In a situation, the platform 600 can be configured to execute several items of software that include smart contracts such that each item of software can be associated with a corresponding first entity (and a corresponding second entity if the item of software includes a smart contract). In this situation, it can be desirable for the platform 600 to protect its own systems and to maintain the integrity of the various items of software being executed on the platform 600.

In an aspect, the technique can include using a virtual machine established by the platform 600. A virtual machine can emulate the functioning of separate computers within a single platform 600. Each virtual machine can have its own corresponding operating system. A virtual instruction set can be used to provide security in a virtual machine environment. In a virtual machine environment, the platform 600 can use a hypervisor to control communications between a virtual machine and its host platform 600 and between the virtual machine and devices external to the platform 600. Many cloud computing service providers use virtual machines to execute items of software for multiple users on a single server. However, because each virtual machine can have its own corresponding operating system, operation of a virtual machine can consume a substantial amount of time and energy and can be expensive.

In an aspect, the technique can include using a protection domain of an operating system of the platform 600. A protection domain, also known as a ring, can be used by an operating system to allow the operating system to isolate individual processes (e.g., items of software) from each other and from access to hardware resources of the platform 600. Examples of security techniques that use protection domains include, but are not limited to, processor-based isolation, FreeBSD (Berkeley Software Distribution) jail mechanisms, Linux Containers (LXC), Security-Enhanced Linux (SELinux), Application Armor (AppArmor), and the Docker project. Implementation of the protection domain can depend upon the ability of the operating system to enforce privilege layers. However, many operating system kernels provide numerous interactions through which an attack can occur, which can make it difficult for a protection domain, alone, to guarantee security. In an aspect, the protection domain can be implemented by isolating a user space of the memory 604.

In an aspect, the technique can include verifying that a programming language of the software 102 is a specific programming language. Such a specific programming language can exclude references to functionality or resources not relevant to execution of the software 102. For example, the programming language E was specifically designed to require that all resources be accessed using unforgeable capacity tokens. For example, interpreted languages, such as JavaScript, can be configured to expose only certain classes and functionality in a browser (such as web application programming interfaces (APIs)). For example, a custom language can be developed to implement the software 102. However, limiting the programming language in which the software 102 can be expressed can limit a number of potential entities that can use the software 102 and can be expensive.

In an aspect, the technique can include checking a machine code, produced in response to the software 102 having been compiled, to verify that the machine code complies with a specific instruction set. This technique can also be known as software fault isolation. Complying with the specific instruction set can include ensuring that the machine code does not include operations outside of the specific instruction set.

In an aspect, the technique that isolates the software 102 can include confining the software 102 to one or more specific segments of the memory 604.

In an aspect, the technique can include using other isolation techniques, such as Google Native Client technology. Google Native Client can isolate the software 102 from a resource of the platform 600 by using a segment of the memory 604 and can limit an ability of the software 102 to perform a function through use of software fault isolation. Google Native Client was designed for executing machine code that complies with the x86 instruction set and was developed to execute machine code through a packet switched network (e.g., the Internet). In addition to 32-bit and 64-bit x86 instruction sets, Native Client can also work with ARM (Acorn RISC (Reduced Instruction Set Computing) Machine) and MIPS (Microprocessor without Interlocked Pipeline Stages) instruction sets. Programming languages that Google Native Client can be used to execute include, but are not limited to, C, C++, Python, V8 JavaScript, Ruby, Go, Mono, and Lua. Web applications supported by Google Native Client include, but are not limited to, Hangouts Video and QuickOffice. Google Native Client can also support Chrome OS (operating system) applications and datacenter hosting. Recent benchmarks have demonstrated that portable Google Native Client modules operate only 10 to 25 percent slower than native code compiled by a low level virtual machine (LLVM). Advantageously, Google Native Client can be efficient to start up and can provide performant execution. Additionally, Google Native Client can consume less processing resources than a virtual machine and can provide a reduced number of interactions through which an attack can occur as compared with a technique based upon a protection domain.

More generally, the technique by which the software 102 can be executed by the platform 600 can include any combination of some or all of the foregoing techniques.

In an aspect, information from a source external to the platform 600 can be received at the platform 600. For example, the information can be received at the first interface 124. The information can be an input for execution of the software 102. In an aspect, the information can be sent from the first entity 112 (or from the second entity if the software 102 includes the smart contract 110). Alternatively, the information can be provided to the first entity 112 (and to the second entity 114 if the software 102 includes the smart contract 110). The information sent from and/or provided to the first entity can be encrypted, such that it can be decrypted by the first entity 112 and/or by the second entity 114, such as in cases where the software 102 includes the smart contract 110. An output of the software 102 can also be provided to the first entity 112 (and to the second entity 114 if the software 102 includes the smart contract 110). The output can also be encrypted, such that it can be decrypted by the first entity 112 and/or by the second entity 114, such as when the software 102 includes the smart contract 110. The information and output can be encrypted using the same encryption protocols and/or algorithms, or different protocols and/or algorithms can be used.

More generally, any information disclosed herein as being transmitted to and/or provided by an entity can be encrypted using any suitable encryption algorithm and protocol. In such cases, each entity that is sending and receiving the information typically will be configured to include suitable decryption algorithms and protocols, where the entity is described as being able to process, analyze, or otherwise use the encrypted information. In some cases, such as where one entity merely receives information and provides it to another entity, the entity may not be configured to, and/or may not be able to decrypt the information.

In an aspect, the software 102 can be received by the platform 600. The software 102 can be sent by the first entity 112. Alternatively, the software 102 can be sent by a second entity. The second entity can be independent of the first entity 112 (and from the second entity 114 if the software 102 includes the smart contract 110). For example, the second entity can be an entity that owns (or has licensed) the software 102, an entity that has written the software 102, or both. Alternatively, the software 102 can have been written by a third entity. The third entity can be independent of both the second entity and the first entity 112 (and the second entity 114 if the software 102 includes the smart contract 110).

In an aspect, the platform 600 can be configured to produce a cryptographic key pair for the software 102. Additionally, the platform 600 can be configured to produce the cryptographic key pair for a specific instance of execution of the software 102. For example, the platform 600 can produce, for each item of software 102 being executed by the platform 600, a unique key pair and the platform 600 can sign the public key. In an aspect, the cryptographic key pair can be associated with a value of a hash of the software 102. Examples of hashes include Message-Digest (MD) Algorithms and Secure Hash Algorithms (SHA), such as MD4, MD5, MD6, SHA-1, SHA-2, SHA-3, and the like. As described above, the hash of the software 102 can be a way to uniquely identify the code of the software 102. In an aspect, a file can be produced at the platform 600. A function of the file can be to attest to production of the cryptographic key pair. An identity of the platform 600 can be included in the file. The identity can be encrypted. For example, the platform 600 can sign, for each item of software 102 being executed by the platform 600, a token to publicly assert that the platform 600 produced the cryptographic key pair for the specific instance of execution of the software 102. For example, the platform 600 can have well-known or easily accessible public keys so that the first entity 112 (and the second entity 114 if the software 102 includes the smart contract 110) can verify a signature of the platform 600. Alternatively or additionally, a private value, such as, for example, an application programming interface (API) key for centralized web services, can be made known to the software 102. In this situation, the platform 600 can report a result of the software 102 or initiate a transaction using the API key rather than, or in addition to, the cryptographic signature.

In an aspect, the platform 600 can be configured to support one or more application programming interfaces (APIs) that can be configured to interact with the software 102. For example, such APIs can improve a granularity of control over functions of the software 102. For example, such APIs can provide a foundation to realize more complex functionality. For example, an entity that has written the software 102 can determine the APIs with which the software 102 can interact. For example, an entity associated with the platform 600 can determine a set of APIs to be provided on the platform 600. In an aspect, the platform 600 can be configured to support APIs in a manner that isolates code of the APIs from a resource of the platform 600, limits an ability of the code of the APIs to perform a function, or both so that the code of the API can become a part of a trusted code base of the platform 600.

For example, the platform 600 can include an API configured to facilitate production of the cryptographic key pair for the specific instance of execution of the software 102. The cryptographic key pair can provide a cryptographic identity for the specific instance of execution of the software 102 on a specific platform 600. The cryptographic key pair can be associated with the value of the hash of the software 102. The API can also be configured to facilitate signing the public key of the cryptographic key pair.

For example, the platform 600 can include an API configured to facilitate receipt of a value having a sequence of digits in which the sequence can be characterized by a degree of randomness sufficient for use in a cryptographic application. Such a value can comprise entropy for use in the cryptographic application.

For example, the platform 600 can include an API configured to facilitate an interaction with a communication system. For example, the communication system can designed according to the Open Systems Interconnection (OSI) model. The interaction with the communication system can be at an application layer, a presentation layer, a session layer, a transport layer, or any combination thereof. For example, the code of the API can be configured to allow direct transport layer calls from the platform 600 to the communication system. The interaction can be in accordance with one or more protocols such as, for example, the Transmission Control Protocol (TCP), the User Datagram Protocol (UDP), the Hypertext Transfer Protocol, and the Simple Mail Transfer Protocol (SMTP).

For example, the platform 600 can include an API configured to facilitate an implementation of a virtual filesystem. The implementation can be designed so that the software 102 can access the virtual filesystem. For example, the implementation can be designed so that data, relevant to the smart contract 110, can be bundled with the software 102. Such bundling can allow the hash of file linked to the smart contract 110 to be associated with the software 102 so that the platform 600 can enforce access controls. Inclusion of a virtual filesystem on the platform 600 can allow the entity that has written the software 102 to structure projects that use the software 102 in a logical manner, particularly when the software 102 includes filesystem commands.

For example, the platform 600 can include an API configured to facilitate interaction with a source of time information. For example, some cryptographic algorithms, such as time-based one-time password (TOTP), can require an accurate time reference. For example, the source of time information can be from a distributed database, such as Google Spanner, an atomic clock, or through the Global Positioning System (GPS).

Figure 7:
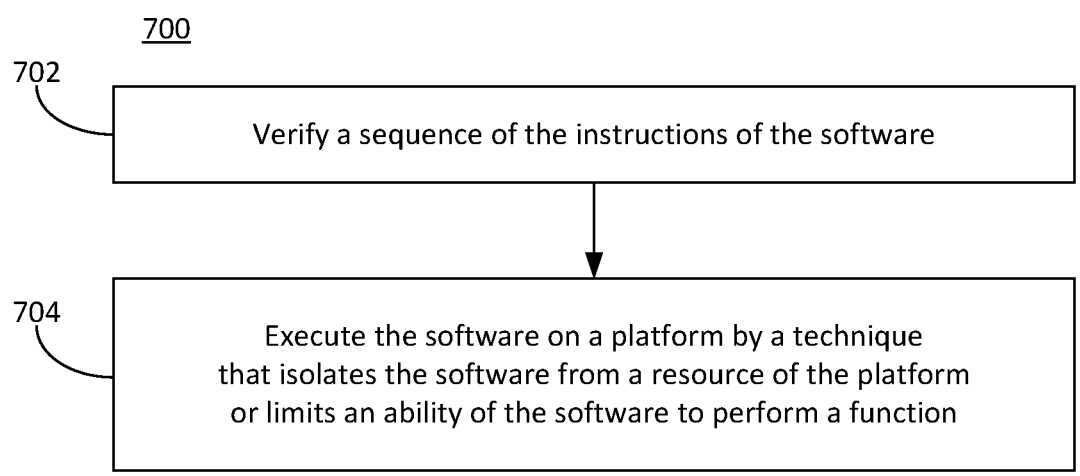
FIG. 7 is a flow diagram illustrating an example of a method for executing software.

FIG. 7 is a flow diagram illustrating an example of a method 700 for executing software. In the method 700, at an operation 702, a sequence of instructions of the software can be verified. In an aspect, the software can include a smart contract. In an aspect, the operation 702 can be performed for each instance of execution of the software. In an aspect, the operation 702 can include at least one of producing a hash of the software, receiving a communication that a compilation code to be used to compile the software has been verified by the first entity, using a deterministic compilation code to compile the software, receiving a communication that the software has been verified by a second entity (the second entity can be independent of the first entity), or any combination thereof.

At an operation 704, the software can be executed, on a platform, by a technique that isolates the software from a resource of the platform, limits an ability of the software to perform a function, or both. Control of the platform can be independent of a first entity. The first entity can be an entity for which the software is being executed. In an aspect, the technique of the operation 704 can include at least one of using a sandbox established by the platform, using a virtual machine established by the platform, using a protection domain of an operating system of the platform, verifying that a programming language of the software is a specific programming language, using an isolated user space of a memory of the platform, using a segment of a memory, checking a machine code (produced in response to the software having been compiled) to verify that the machine code complies with a specific instruction set, using Google Native Client technology, or any combination thereof.

Figure 8:
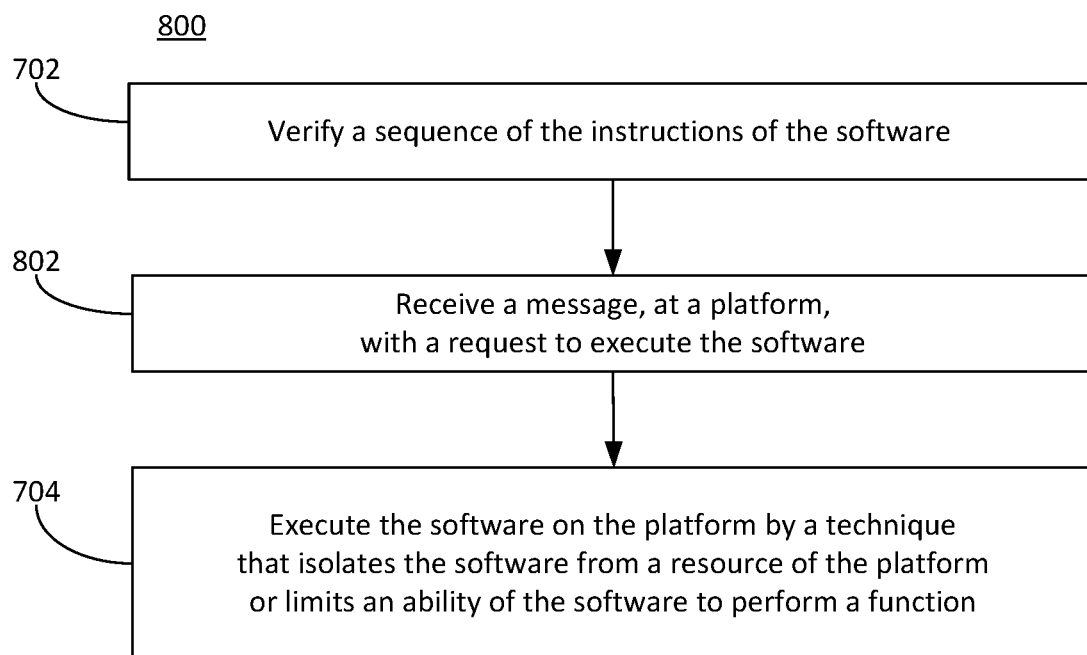
FIG. 8 is a flow diagram illustrating an example of a method for executing software.

FIG. 8 is a flow diagram illustrating an example of a method 800 for executing software. In the method 800, at the operation 702, the sequence of instructions of the software can be verified. At an operation 802, a message can be received at the platform. The message can include a request to the platform to execute the software. For example, the message can be sent by the first entity. At the operation 704, the software can be executed, on the platform, by the technique that isolates the software from the resource of the platform, limits the ability of the software to perform the function, or both.

Figure 9:
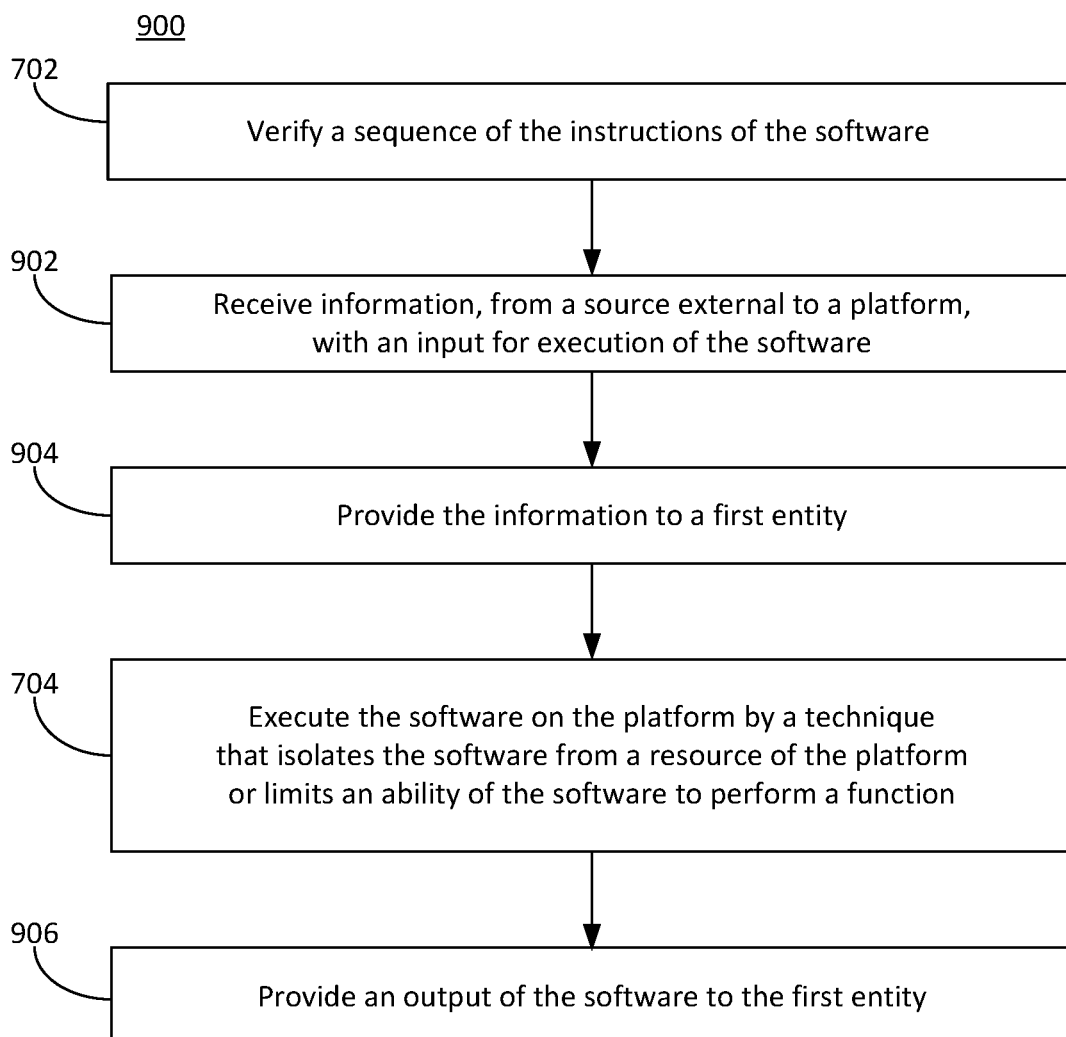
FIG. 9 is a flow diagram illustrating an example of a method for executing software.

FIG. 9 is a flow diagram illustrating an example of a method 900 for executing software. In the method 900, at the operation 702, the sequence of instructions of the software can be verified. At an operation 902, information from a source external to the platform can be received at the platform. The information can be an input for execution of the software. At an operation 904, the information can be provided to the first entity. The information can be encrypted in a first manner. The first manner can be configured to be decrypted by the first entity. At the operation 704, the software can be executed, on the platform, by the technique that isolates the software from the resource of the platform, limits the ability of the software to perform the function, or both. At an operation 906, an output of the software can be provided to the first entity. The output can be encrypted in a second manner. The second manner can be configured to be decrypted by the first entity.

Figure 10:
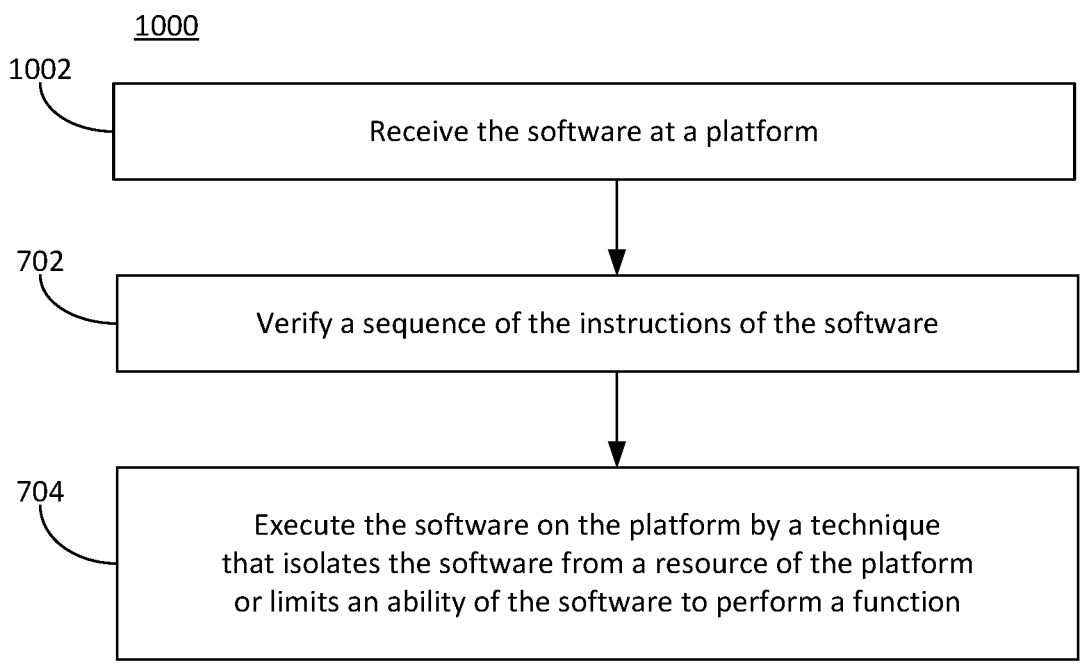
FIG. 10 is a flow diagram illustrating an example of a method for executing software.

FIG. 10 is a flow diagram illustrating an example of a method 1000 for executing software. In the method 1000, at an operation 1002, the software can be received by the platform. The software can be sent by the first entity. Alternatively, the software can be sent by a second entity. The second entity can be independent of the first entity. In an aspect, the software can have been written by a third entity. The third entity can be independent of both the second entity and the first entity. At the operation 702, the sequence of instructions of the software can be verified. At the operation 704, the software can be executed, on the platform, by the technique that isolates the software from the resource of the platform, limits the ability of the software to perform the function, or both.

Figure 11:
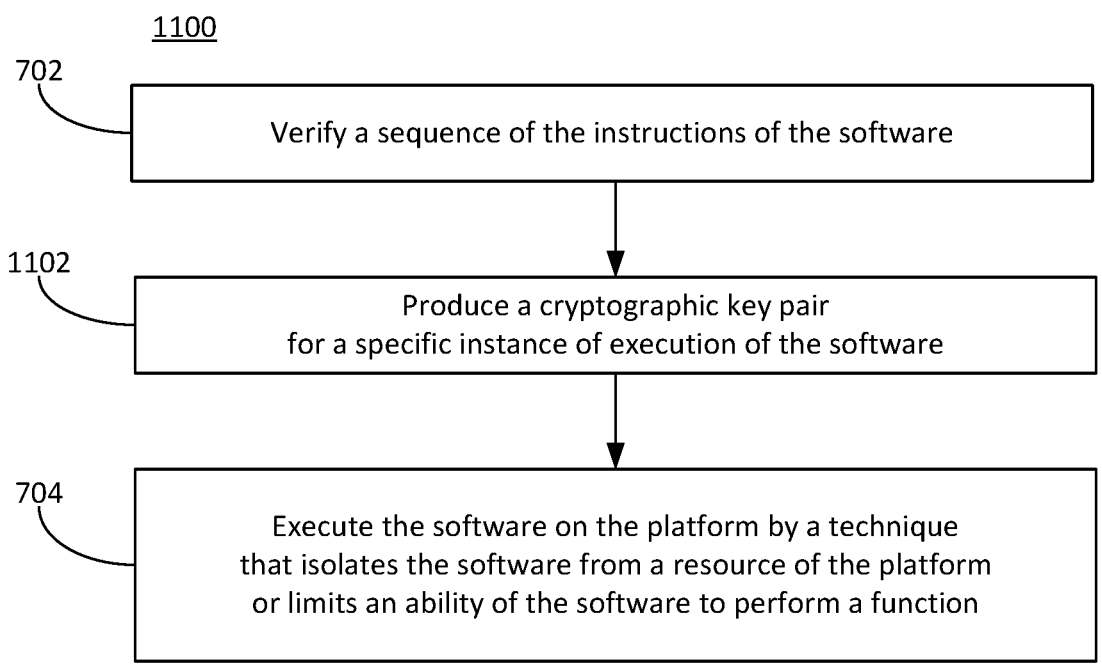
FIG. 11 is a flow diagram illustrating an example of a method for executing software.

FIG. 11 is a flow diagram illustrating an example of a method 1100 for executing software. In the method 1100, at the operation 702, the sequence of instructions of the software can be verified. At an operation 1102, a cryptographic key pair for a specific instance of execution of the software can be produced. In an aspect, the cryptographic key pair can be associated with a value of a hash of the software. In an aspect, at an optional operation 1104, a file can be produced at the platform. A function of the file can be to attest to production of the cryptographic key pair. An identity of the platform can be included in the file. The identity can be encrypted. At the operation 704, the software can be executed, on the platform, by the technique that isolates the software from the resource of the platform, limits the ability of the software to perform the function, or both.

In an aspect, the software can be executed using any combination of the operations of the methods 700, 800, 900, 1000, and 1100.

Figure 12:
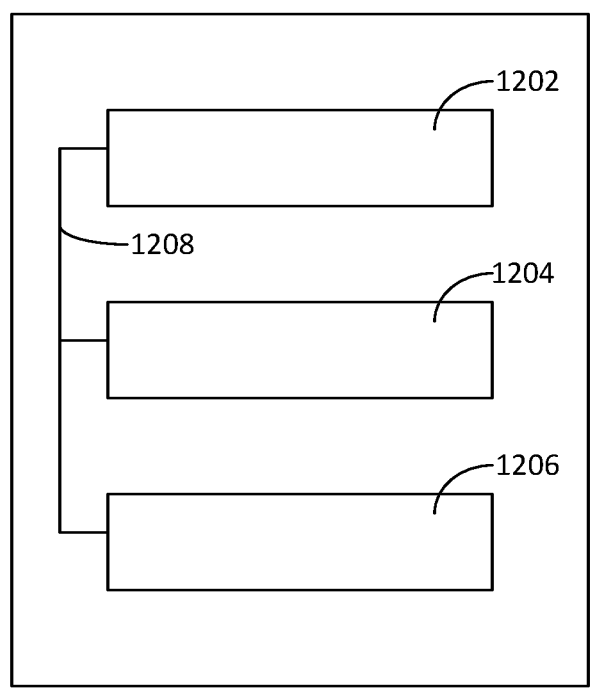
FIG. 12 is a diagram illustrating an example of a device illustrated in FIGS. 1 through 5.

FIG. 12 is a diagram illustrating an example of a device 1200. The device 1200 can be an implementation of at least one of the first device 106, the second device 108, the third device 206, at least one of the first devices 304, or at least one of the second devices 402. The device 1200 can be any type of computer system suitable to communicate with the platform 104 or one of the platforms 202. The device 1200 can include a processor 1202, a memory 1204, communications circuitry 1206, and a bus 1208. The processor 1202 can include any processing circuitry operative to control an operation of the platform 1200. The memory 1204 can include one or more storage media. For example, the memory 1204 can include at least one of a hard-drive, a solid-state drive, optical drive, floppy disk, flash memory, read-only memory (ROM), random-access memory (RAM), cache memory, a Fibre Channel network, a storage area network (SAN), or any combination thereof. The communications circuitry 1206 can provide communications between the device 1200 and devices external to the device 1200. The communications circuitry 1206 can be configured to provide communications via a packet switched network, a cellular network, a satellite network, an optical network, a telephone link, the like, or any combination thereof. The communications circuitry 1206 can be configured to provide communications in a wired or a wireless manner. The communications circuitry 1206 can be configured to perform simultaneously several communications operations using different networks. The bus 1208 can be coupled to the processor 1202, the memory 1204, and the communications circuitry 1206, and can be configured to facilitate communication among these components. Other devices and components (not illustrated) can be included in the device 1200. Conversely, in an aspect, all of the components illustrated in FIG. 12 may not need to be included in the device 1200.

In an aspect, the device 1200 can be configured to receive, from each of the platforms 202, a result produced from an execution of a copy of the software 102 by a corresponding platform, to determine a number of matching results, and to determine that the number of the matching results is equal to or greater than a first threshold. For example, the communication circuitry 1206 can be configured to receive, from each of the platforms 202, the result produced from the execution of the copy of the software 102 by the corresponding platform. For example, the memory 1204 can be configured to store results from the platforms 202. For example, the processor 1206 can be configured to determine a number of matching results of execution of the software and to determine that the number of the matching results is equal to or greater than the first threshold. For example, the bus 1208 can be coupled to the communication circuitry 1206, the memory 1204, and the processor 1202. For example, an entity associated with or that controls the device 1200 can accept the matching results as an agreed-upon output of the software 102 in response to the number of the matching results being equal to or greater than the first threshold. In an aspect, the software 102 can include an implementation of at least a portion of an act associated with an agreement between at least two entities (e.g., a smart contract).

In an aspect, a code of a first copy of the software 102 can be different from a code of a second copy of the software 102, but the first copy can be configured to perform a same function as the second copy. This aspect recognizes that in a situation it can be the case that the platforms 202 can be executing different copies of the software 102, but that these different copies perform a same or similar function. This aspect also recognizes that compiling identical copies of the software 102 using different compilation codes can produce different machine codes.

In an aspect, a first result can match a second result if the first result is identical to the second result. In an aspect, a first result can match a second result if a difference between the first result and the second result is less than or equal to a second threshold. This aspect recognizes that results produced from the execution of copies of the software 102 can be considered to be matching results if they are within a degree of tolerance of each other even if they are not identical. For example, as described above, the results produced from the execution of the copies of the software 102 can vary if the code of one copy of the software 102 is different from the code of another copy of the software 102 or if different compilation codes produce different machine codes. For example, the results produced from the execution of the copies of the software 102 can vary if the software 102 is nondeterministic. For example, the results produced from the execution of the copies of the software 102 can vary if a configuration of one of the platforms 202 is different from configurations of others of the platforms 202.

In an aspect, the device 1200 can be configured to associate each of the results with a corresponding category, to associate each of the results with a corresponding weight value, to determine the number of the matching results by determining, for each of one or more categories, the number of the matching results by producing, for each of the one or more categories, a sum of corresponding weight values, and to determine that the number of the matching results is equal to or greater than the first threshold by determining which of the one or more categories has the sum that is equal to or greater than the first threshold. For example, the processor 1202 can be further configured to associate each of the results with a corresponding category, to associate each of the results with a corresponding weight value, to determine the number of the matching results by determining, for each of one or more categories, the number of the matching results by producing, for each of the one or more categories, a sum of corresponding weight values, and to determine that the number of the matching results is equal to or greater than the first threshold by determining which of the one or more categories has the sum that is equal to or greater than the first threshold, and the memory can be further configured to store the weight values.

By way of example and not by way of limitation, with reference to the agreement, described above, that involves the periodic transfer of value from the first entity 112 to the second entity 114 in response to the degree of progress of the project in which the second entity 114 paints the building owned by the first entity 112 (or, alternatively, owned by an entity different from the first entity 112), a first category can be "agreed-upon degree of progress has been made" and a second category can be "agreed-upon degree of progress has not been made." By way of example and not by way of limitation, with reference to FIG. 2, the result of the platform 202-1 can be associated with a weight value of 2.1, the result of the platform 202-2 can be associated with a weight value of 0, and the result of the platform 202-N can be associated with a weight value of –0.7. The weight value can relate to a degree of trust in a given platform. In an aspect, a high, positive weight value can indicate a high degree of trust, a zero value can indicate that the result ought to be disregarded, and a negative weight value can indicate a negative degree of trust. For example, a negative weight value can indicate that a platform is expected to produce a dishonest or incorrect result. The weight values can be assigned ahead of time by the entity associated with or that controls the device 1200, and can be assigned based on any desired criteria. For example, if the entity associated with or that controls the device 1200 is the first entity 112, then the first entity 112 can assign weight values based on a degree of trust established by prior use of specific platforms. (If the software 102 includes the smart contract 110, then weight values can be assigned by the first entity 112 in conjunction with the second entity 114.) As a specific example, the first entity 112 can assign a relatively low weight value, such as 0.1, to a platform that has not been used in the past, and a relatively high weight value, such as 0.9 or 1, to a platform that has been used in the past and has not provided results that were outside of the corresponding threshold for the prior uses.

With reference to FIG. 12, in an aspect, the device 1200 can be a first device (not illustrated) and a second device (not illustrated). The first device can be associated with or controlled by a first entity. The second device can be associated with or controlled by a second entity. For example, the second entity can be independent of the first entity. For example, the first device can be configured to receive, from each of the platforms 202, the result produced from the execution of the copy of the software 102 by the corresponding platform, to determine the number of the matching results, to determine that the number of the matching results is equal to or greater than the first threshold, and to send a signal to the second device. The signal can include information about whether the number of the matching results is greater than or equal to the first threshold. For example, the communication circuitry 1206 of the first device can be further configured to send the signal to the second device. For example, the matching results can be accepted, by the entity associated with or that controls the second device, as the agreed-upon output of the software in response to the number of the matching results being equal to or greater than the first threshold. For example, with reference to FIG. 2, the first device described here can be the third device 206 illustrated in FIG. 2 and the second device described here can be the first device 106 illustrated in FIG. 2.

In an aspect, the device 1200 can be configured to send a message to each of the platforms 202. The message can include a request for the corresponding platform to execute the copy of the software 102. For example, the communication circuitry 1206 can be configured to send the message to each of the platforms 202. In an aspect, the message can include a hash of the software. The hash can be configured to identify the software.

With reference to FIG. 12, in an aspect, the device 1200 can be configured to send a message to each of the platforms 202. The message can include an input for the software 102. For example, the communication circuitry 1206 can be configured to send the message to each of the platforms 202. For example, with reference to FIG. 6, information from a source external to the platform 600 can be received at the platform 600. For example, the information can be received at the first interface 124. The information can be an input for execution of the software 102. In an aspect, the information can be sent from the first entity 112 (or from the second entity if the software 102 includes the smart contract 110).

With reference to FIG. 12, in an aspect, the device 1200 can be configured to send at least one copy of the software 102 to at least one of the platforms 202. For example, the communication circuitry 1206 can be configured to send the at least one copy of the software 102 to the at least one of the platforms 202. For example, with reference to FIG. 6, in an aspect, the software 102 can be received by the platform 600. The software 102 can be sent by the first entity 112.

With reference to FIG. 12, in an aspect, the device 1200 can be configured to select the platforms 202, to be used to execute copies of the software 102, from a population of platforms. For example, the processor 202 can be configured to select the platforms 202 from the population of platforms.

For example, the device 1200 can be configured to select the platforms 202, to be used to execute the copies of the software 102, from a population of platforms by using a proof-of-work approach. For example, prior to selecting a specific platform (e.g., the platform 600) to execute a copy of the software 102 and to verify an ability of the specific platform, the device 1200 can request the given platform to solve a specific computational puzzle (i.e., work) and to provide a solution to the computational puzzle to the device 600. The device 1200 can determine whether to select the given platform based on the difficulty of the computational puzzle, the correctness of the result, the time taken by the given platform to generate the solution, the number of correct solutions to the puzzle, the variant, form, or format of the solution provided by the given platform, and so on. In an implementation, the computational puzzle can be customized by providing certain inputs or setting specific variables relevant to the puzzle. In such situations, the device 1200 can determine whether to select the given platform based at least partly on the specific inputs or variable settings used for the particular instantiation of the computational puzzle to be solved by the given platform. For example, a computational puzzle can include presenting a hash value and a hash function and asking the given platform to find the input to the hash function that produced the hash value. The bit length of the hash value can be changed, as can the hash value itself. If the hash function is a keyed-hash message authentication code (HMAC) such as HMAC-MD5 and/or HMAC-SHA1, then an input can be all or part of a cryptographic key. Such inputs can be used to tune the difficulty and character of the computational puzzle.

Alternatively or in addition, for example, the specific platform can publish the solution to the computational puzzle and solutions to other computational puzzles that the specific platform has solved. Likewise, other platforms can publish solutions to computational puzzles that they have solved. Such solutions can be published, for example, in a peer-to-peer network. The device 1200 can be configured to select the platforms 202, to be used to execute the copies of the software 102, from a population of platforms by reviewing the published solutions to the computational puzzles and to select the platforms based on an assessment of the published solutions.

Alternatively or in addition, for example, the platforms can be ranked based upon the published solutions to the computational puzzles. For example, rankings can be based upon the number of computational puzzles solved by a specific platform, a degree of difficulty of the computational puzzles solved by the specific platform, a speed at which the computational puzzles are solved, the like, or any combination thereof. The device 1200 can be configured to select the platforms 202, to be used to execute the copies of the software 102, from a population of platforms based upon the rankings of the platforms.

For example, the device 1200 can be configured to select the platforms 202, to be used to execute the copies of the software 102, from a population of platforms based upon an assessment of platforms in the population. For example, the assessment can be based upon the entity or entities associated with, or that control, each of the platforms. As a specific example, the degree of relevancy between activities performed by, and/or information in the possession of, an entity associated with or that controls a specific platform may be considered when assessing the platforms. As another example, activities performed by and/or information in the possession of an entity associated with or that controls the device 1200 and/or the subject matter of the software 102 can be considered.

For example, the device 1200 can be configured to select the platforms 202, to be used to execute the copies of the software 102, from a population of platforms based upon a trust model used by the entity associated with or that controls the device 1200. By way of example and not by way of limitation, if the entity associated with or that controls the device 1200 is an exporter, then the trust model used by the exporter can involve selecting at least one platform associated with or controlled by an entity that is an importer that has a business relationship with the exporter or a bank that has a business relationship with the exporter. Additionally, for example, the trust model can involve selecting at least one platform associated with or controlled by an entity that values its reputation as disinterested in the result of the software 102 (e.g., an agency of the United States Government, an agency of the United Nations, a nongovernment organization, a nonprofit organization, an auditing and/or attestation firm, etc.). Alternatively or in addition, the trust model can involve selecting at least one platform associated with or controlled by an entity that has been vetted by a validator selection process such as the validator selection process performed by Ripple Labs of San Francisco, Calif. As another example, the trust model can involve selecting platforms associated with or controlled by entities in a manner to achieve a desired degree of diversity among the entities, such as diversity of political affiliations, economic interests, geographic locations, the like, or any combination thereof. More generally, the trust model can involve selecting platforms associated with or controlled by entities that have a stake in the result of the software 102, that have a stake in having a reputation for honesty, or both.

As another example, the device 1200 can be configured to select the platforms 202, to execute the copies of the software 102, from a population of platforms included in a database of domain names. Such a database of domain names can include, for example, the database maintained by Alexa Internet, Inc. of San Francisco, Calif., which provides information about web traffic for web sites. The device 1200 can be configured to determine which web sites are associated with platforms. Additionally, the device 1200 can be configured to determine identities of entities associated with or that control the platforms associated with the web sites. Inclusion of a web site in such a database can be indicative that the entity associated with the web site values its reputation for providing a trustworthy platform. Additionally, a selection of several entities from such a database can be likely to achieve a desired degree of diversity among the entities, which can further the likelihood that at least some trustworthy platforms have been selected.

Additionally or alternatively, the device 1200 can be configured to select the platforms 202, to execute the copies of the software 102, from a population of platforms by searching the World Wide Web for entities associated with or that control platforms and selecting the platforms based upon a ranking of the web sites. The ranking of the web sites can be indicative that the entities associated with the web sites value their reputations for providing trustworthy platforms. Additionally, a selection of several entities based upon the ranking of the respective web sites can be likely to achieve a desired degree of diversity among the entities, which can further the likelihood that at least some trustworthy platforms have been selected.

For example, the device 1200 can be configured to select the platforms 202, to be used to execute the copies of the software 102, from a population of platforms in which each specific platform is willing to transfer an amount of money to an escrow account and to receive the amount of money from the escrow account contingent upon a result of the specific platform being among the number of matching results.

For example, the device 1200 can be configured to select the platforms 202, to be used to execute the copies of the software 102, from a population of platforms based upon the platforms and/or the entities associated with or that control the platforms having been validated by a validating entity (e.g., a notary public, a source of user or expert reviews, a governing body for a validation standard, etc.). Additionally or alternatively, the device 1200 can be configured to select the platforms 202, to be used to execute the copies of the software 102, from a population of platforms that excludes platforms identified on a black list as problematic and/or trustworthy.

For example, the device 1200 can be configured to select the platforms 202, to be used to execute the copies of the software 102, from a population of platforms based upon a longevity of time in which specific platforms have been engaged in instances of executing software similar to (or the same as) the software 102.

More generally, the device 1200 can be configured to select the platforms 202, to be used to execute the copies of the software 102, from a population of platforms by using any combination of some or all of the foregoing techniques or other techniques. For example, a specific platform that has been identified, using a variety of these or other techniques, to be trustworthy may be more likely than other platforms to be trustworthy.

Figure 13:
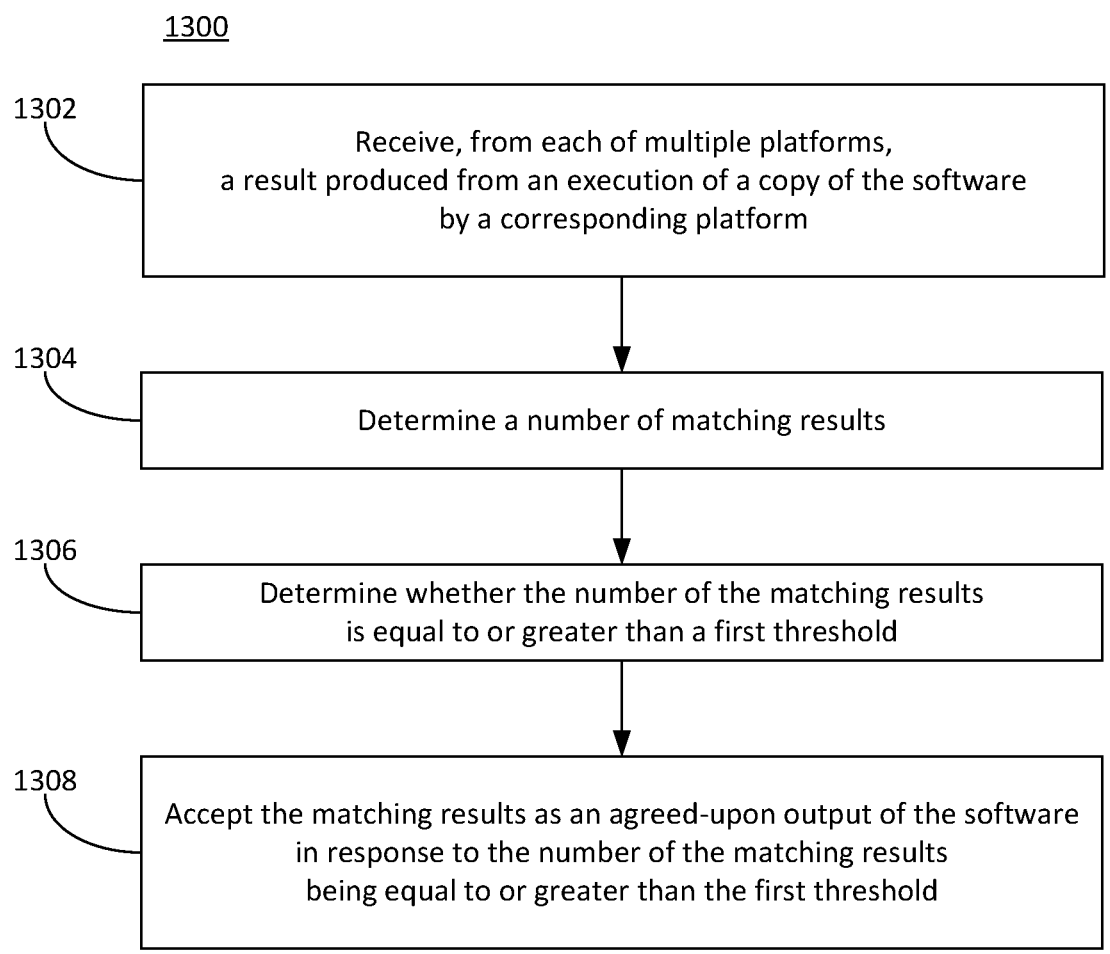
FIG. 13 is a flow diagram illustrating an example of a method for causing software to be executed.

FIG. 13 is a flow diagram illustrating an example of a method 1300 for causing software to be executed. In the method 1300, at an operation 1302, a result, produced from an execution of a copy of the software by a corresponding platform, can be received from each of multiple platforms. At an operation 1304, a number of matching results of execution of the software can be determined. At an operation 1306, whether the number of the matching results is equal to or greater than a first threshold can be determined. At an operation 1308, the matching results can be accepted as an agreed-upon output of the software in response to the number of the matching results being equal to or greater than the first threshold. In an aspect, the software can include an implementation of at least a portion of an act associated with an agreement between at least two entities (e.g., a smart contract).

In an aspect, a code of a first copy of the software can be different from a code of a second copy of the software, but the first copy can be configured to perform a same function as the second copy.

In an aspect, a first result can match a second result if the first result is identical to the second result. In an aspect, a first result can match a second result if a difference between the first result and the second result is less than or equal to a second threshold.

Figure 14:
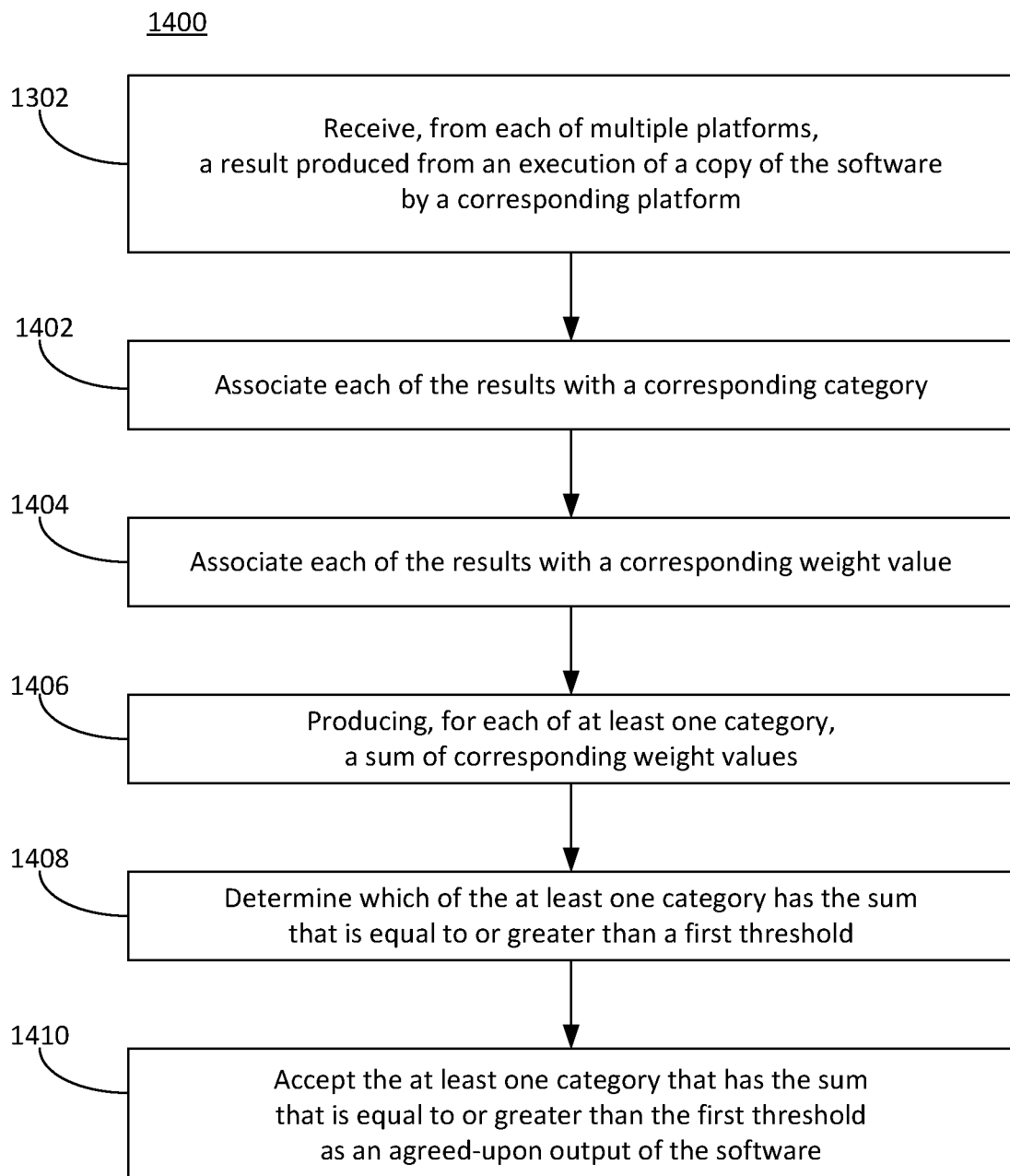
FIG. 14 is a flow diagram illustrating an example of a method for causing software to be executed.

FIG. 14 is a flow diagram illustrating an example of a method 1400 for causing software to be executed. In the method 1400, at the operation 1302, the result, produced from the execution of the copy of the software by the corresponding platform, can be received from each of multiple platforms. At an operation 1402, each of the results can be associated with a corresponding category. At an operation 1404, each of the results can be associated with a corresponding weight value. At an operation 1406, a sum of corresponding weight values can be produced for each of one or more categories. At an operation 1408, which of the one or more categories that has the sum that is equal to or greater than the first threshold can be determined. At an operation 1410, the category that has the sum that is equal to or greater than the first threshold can be accepted as an agreed-upon output of the software.

Figure 15:
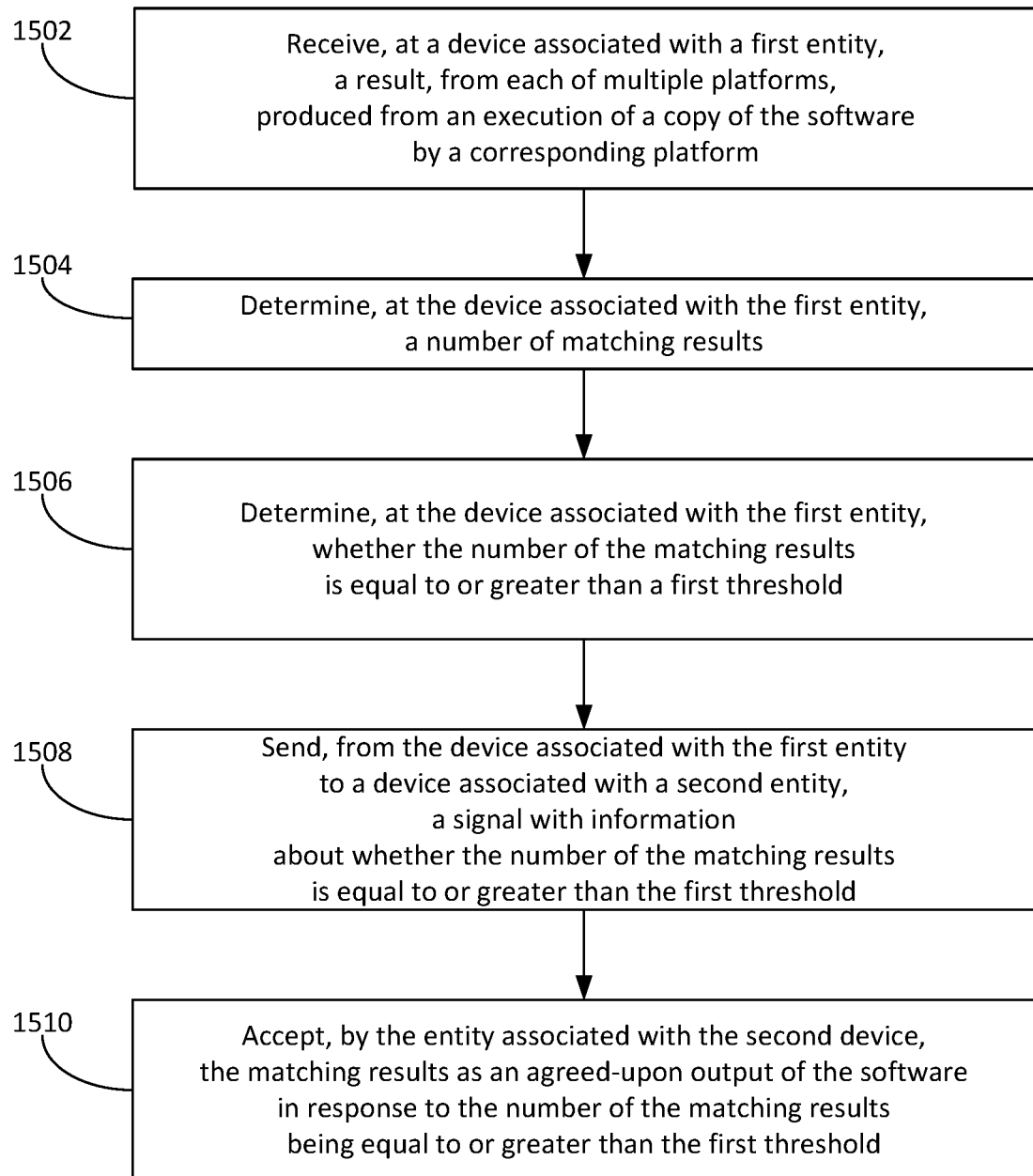
FIG. 15 is a flow diagram illustrating an example of a method for causing software to be executed.

FIG. 15 is a flow diagram illustrating an example of a method 1500 for causing software to be executed. In the method 1500, at an operation 1502, the result, produced from the execution of the copy of the software by the corresponding platform, can be received, from each of multiple platforms, at a device associated with or controlled by a first entity. At an operation 1504, the number of the matching results of execution of the software can be determined at the device associated with or controlled by the first entity. At an operation 1506, whether the number of the matching results is equal to or greater than the first threshold can be determined at the device associated with or controlled by the first entity. At an operation 1508, a signal can be sent from the device associated with or controlled by the first entity to a device associated with or controlled by a second entity. The signal can include information about whether the number of the matching results is equal to or greater than the first threshold. For example, the second entity can be independent of the first entity. At an operation 1510, the matching results can be accepted, by the entity associated with or controlled by the second device, as the agreed-upon output of the software in response to the number of the matching results being equal to or greater than the first threshold.

Figure 16:
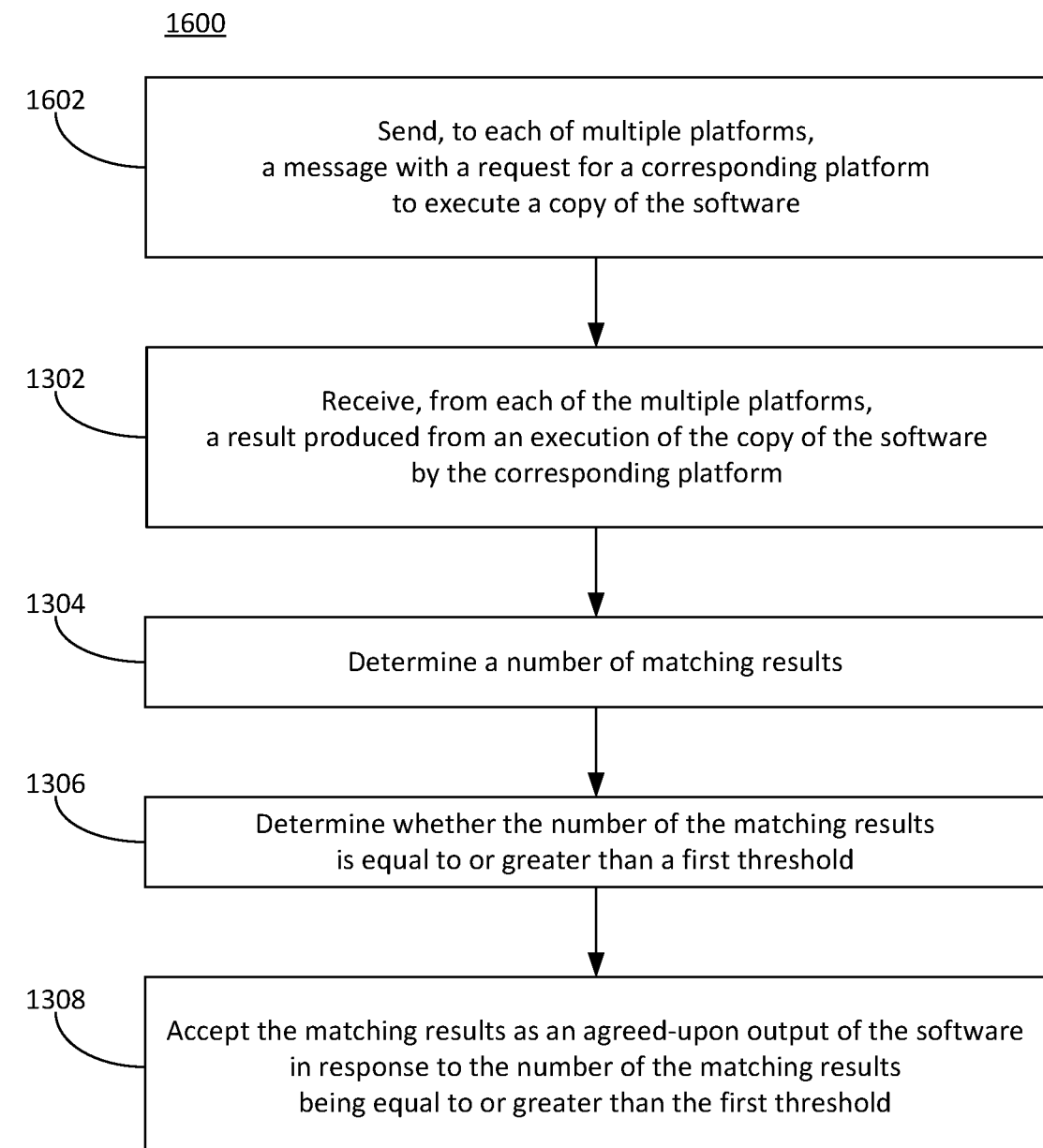
FIG. 16 is a flow diagram illustrating an example of a method for causing software to be executed.

FIG. 16 is a flow diagram illustrating an example of a method 1600 for causing software to be executed. In the method 1600, at an operation 1602, a message can be sent to each of multiple platforms. The message can include a request for the corresponding platform to execute the copy of the software. In an aspect, the message can include a hash of the software. The hash can be configured to identify the software and, in some instances, to authenticate the integrity of the software. At the operation 1302, the result, produced from the execution of the copy of the software by the corresponding platform, can be received from each of the multiple platforms. At the operation 1304, the number of matching results of execution of the software can be determined. At the operation 1306, whether the number of the matching results is equal to or greater than the first threshold can be determined. At the operation 1308, the matching results can be accepted as the agreed-upon output of the software in response to the number of the matching results being equal to or greater than the first threshold. For example, an entity may desire to use a particular software that the entity knows has a specific hash. The entity can send requests to multiple platforms to determine whether each platform has software available for execution by the platform that has the same hash. The entity can then select the platforms to use for execution of the software from among those that provide a response indicating that the software having the desired hash is available on that platform.

Figure 17:
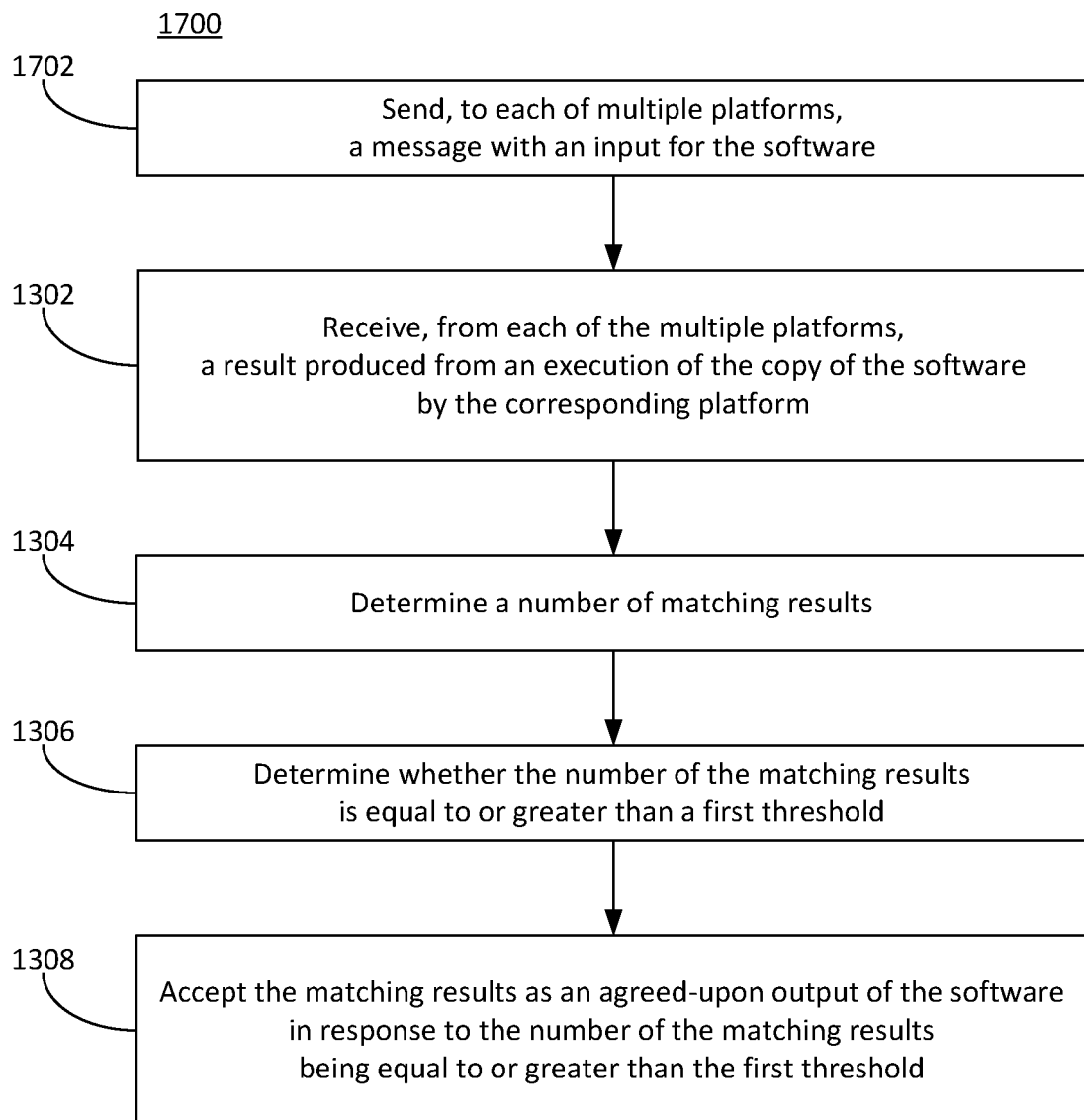
FIG. 17 is a flow diagram illustrating an example of a method for causing software to be executed.

FIG. 17 is a flow diagram illustrating an example of a method 1700 for causing software to be executed. In the method 1700, at an operation 1702, a message can be sent to each of multiple platforms. The message can include an input for the software. At the operation 1302, the result, produced from the execution of the copy of the software by the corresponding platform, can be received from each of the multiple platforms. At the operation 1304, the number of matching results of execution of the software can be determined. At the operation 1306, whether the number of the matching results is equal to or greater than the first threshold can be determined. At the operation 1308, the matching results can be accepted as the agreed-upon output of the software in response to the number of the matching results being equal to or greater than the first threshold.

Figure 18:
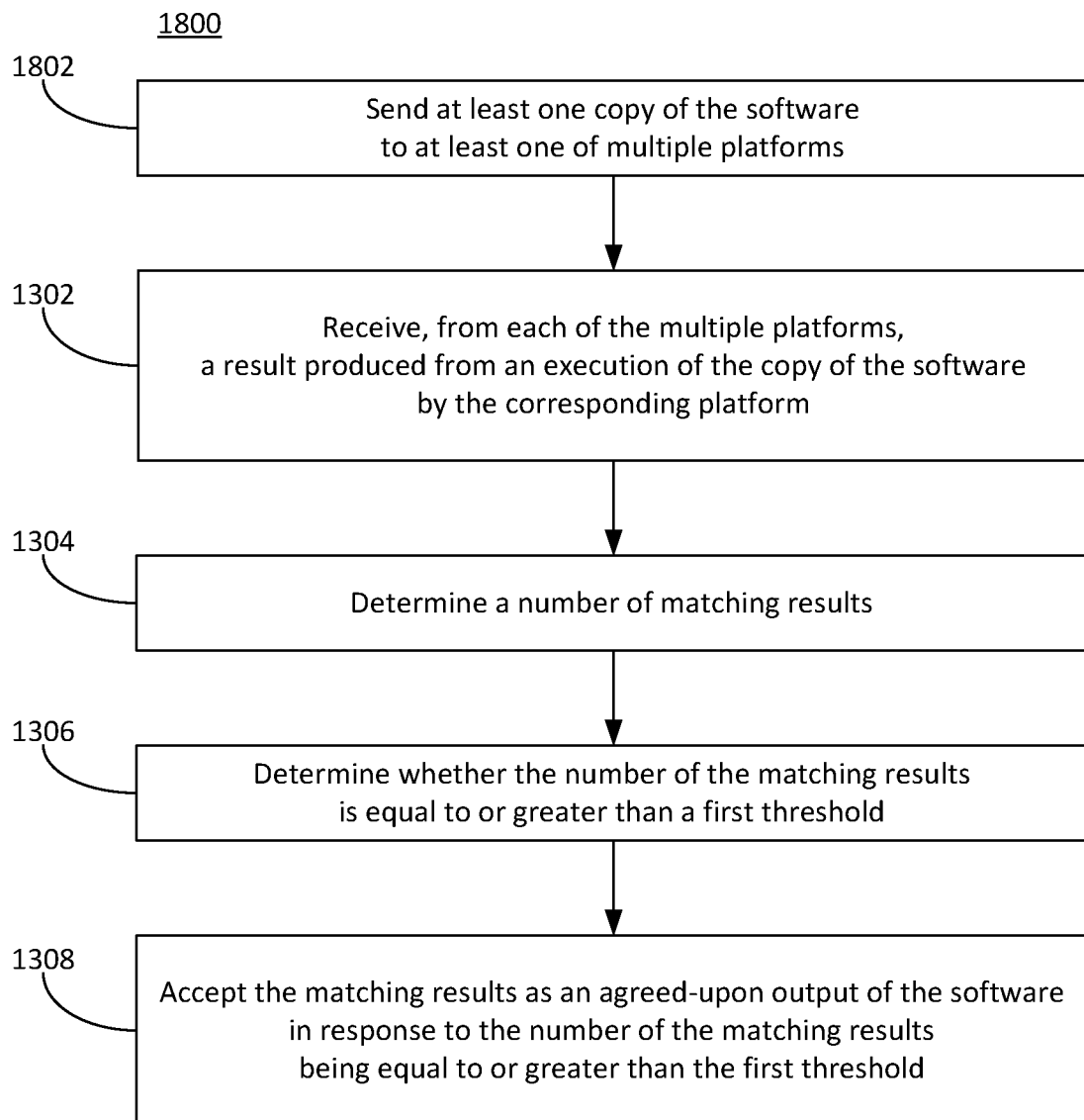
FIG. 18 is a flow diagram illustrating an example of a method for causing software to be executed.

FIG. 18 is a flow diagram illustrating an example of a method 1800 for causing software to be executed. In the method 1800, at an operation 1802, at least one copy of the software can be sent to at least one of multiple platforms. At the operation 1302, the result, produced from the execution of the copy of the software by the corresponding platform, can be received from each of the multiple platforms. At the operation 1304, the number of matching results of execution of the software can be determined. At the operation 1306, whether the number of the matching results is equal to or greater than the first threshold can be determined. At the operation 1308, the matching results can be accepted as the agreed-upon output of the software in response to the number of the matching results being equal to or greater than the first threshold.

Figure 19:
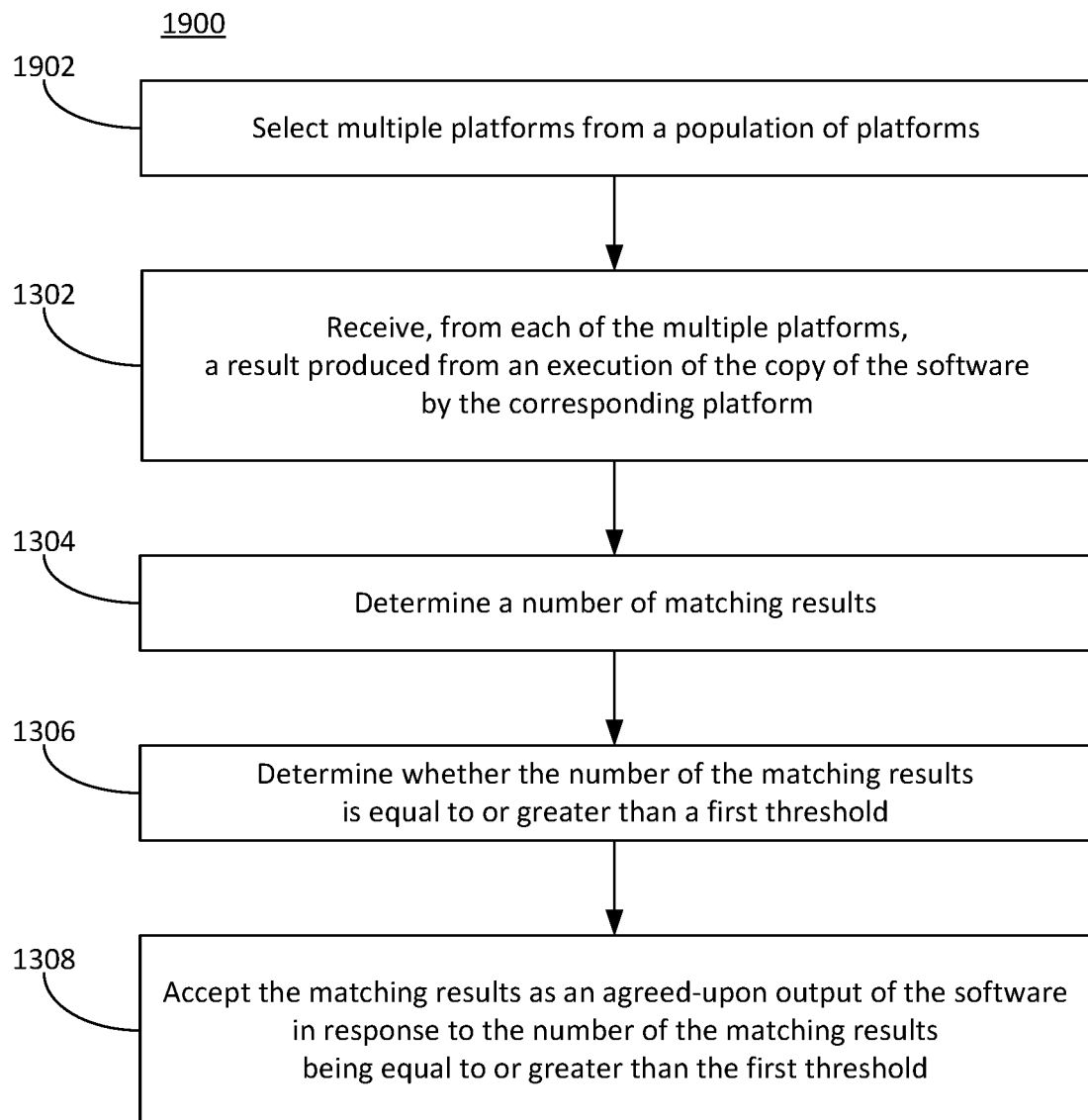
FIG. 19 is a flow diagram illustrating an example of a method for causing software to be executed.

FIG. 19 is a flow diagram illustrating an example of a method 1900 for causing software to be executed. In the method 1900, at an operation 1902, multiple platforms can be selected from a population of platforms. At the operation 1302, the result, produced from the execution of the copy of the software by the corresponding platform, can be received from each of the multiple platforms. At the operation 1304, the number of matching results of execution of the software can be determined. At the operation 1306, whether the number of the matching results is equal to or greater than the first threshold can be determined. At the operation 1308, the matching results can be accepted as the agreed-upon output of the software in response to the number of the matching results being equal to or greater than the first threshold.

In an aspect, the software can be caused to be executed using any combination of the operations of the methods 1300, 1400, 1500, 1600, 1700, 1800, and 1900.

More generally, various aspects of the presently disclosed subject matter can include or be embodied in the form of computer-implemented processes and apparatuses for practicing those processes. Aspects also can be implemented in the form of a computer program product having computer program code containing instructions embodied in non-transitory and/or tangible media, such as floppy diskettes, compact disc read-only memory (CD-ROMs), hard drives, universal serial bus (USB) drives, or any other machine readable storage medium, such that when the computer program code is loaded into and executed by a computer, the computer becomes an apparatus for practicing aspects of the disclosed subject matter. Aspects also can be implemented in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing aspects of the disclosed subject matter. When implemented on a general-purpose microprocessor, the computer program code segments can configure the microprocessor to produce specific logic circuits.

In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Aspects can be implemented using hardware that can include a processor, such as a general purpose microprocessor and/or an application-specific integrated circuit (ASIC) that implements all or part of the techniques according to aspects of the disclosed subject matter in hardware and/or firmware. The processor can be coupled to memory, such as random-access memory (RAM), read-only memory (ROM), flash memory, a hard disk or any other device configured to store electronic information. The memory can store instructions adapted to be executed by the processor to perform the techniques according to aspects of the disclosed subject matter.

The foregoing description, for purpose of explanation, has been described with reference to specific aspects. However, the illustrative discussions above are not intended to be exhaustive or to limit aspects of the disclosed subject matter to the precise forms disclosed. Many modifications and variations are possible in view of the above teachings. The aspects were chosen and described in order to explain the principles of aspects of the disclosed subject matter and their practical applications, to thereby enable others skilled in the art to utilize those aspects as well as various aspects with various modifications as may be suited to the particular use contemplated.

The invention claimed is:

1. A method for verifying a sequence of instructions of a software, comprising:
   receiving, at a first electronic device from a first computer platform, a first hash of a first copy of the software, the first copy of the software having been received by the first computer platform from a second electronic device, the first computer platform configured to execute the first copy of the software;
   receiving, at the first electronic device from the second electronic device, a second copy of the software;
   producing, at the first electronic device, a second hash of the second copy of the software;
   comparing, at the first electronic device, the first hash and the second hash;

sending, from the first electronic device and in response to a result of a comparison between the first hash and the second hash being that the first hash does not match the second hash, a first signal, the first signal configured to prevent a result of an execution of the first copy of the software by the first computer platform from being sent to the first electronic device; and sending, from the first electronic device and in response to the result of the comparison between the first hash and the second hash being that the first hash matches the second hash, a second signal, the second signal configured to cause the result of the execution of the first copy of the software by the first computer platform to be sent to the first electronic device.

2. The method of claim 1, wherein the sending the first signal comprises sending the first signal to the second electronic device, the first signal configured to cause the second electronic device to send a second signal to the first computer platform.

3. The method of claim 1, wherein the sending the first signal comprises sending the first signal to the first computer platform.

4. The method of claim 1, further comprising:

receiving, at the first electronic device from a second computer platform, a third hash of a third copy of the software, the third copy of the software having been received by the second computer platform from the second electronic device; the second computer platform configured to execute the third copy of the software;

comparing, at the first electronic device, the first hash and the third hash;

sending, from the first electronic device and in response to a result of a comparison between the first hash and the third hash being that the first hash does not match the third hash, a third signal, the third signal configured to prevent a result of an execution of the third copy of the software by the third computer platform from being sent to the first electronic device; and sending, from the first electronic device and in response to the result of the comparison between the first hash and the third hash being that the first hash matches the third hash, a fourth signal, the fourth signal configured to cause the result of the execution of the third copy of the software by the second computer platform to be sent to the first electronic device.

5. The method of claim 4, further comprising comparing, at the first electronic device the result of the execution of the first copy of the software and the result of the execution of the third copy of the software.

6. The method of claim 4, further comprising receiving, at the first electronic device from a third electronic device, a fifth signal, the fifth signal including an information about a result of a comparison between the result of the execution of the first copy of the software and the result of the execution of the third copy of the software.

7. The method of claim 1, wherein the software includes an implementation of at least a portion of an act associated with an agreement between at least two entities.

8. A non-transitory computer-readable medium storing computer code for controlling a processor to cause the processor to verify a sequence of instructions of a software, the computer code including instructions to cause the processor to:

receive, from a computer platform, a first hash of a first copy of the software, the first copy of the software having been received by the computer platform from an electronic device, the computer platform configured to execute the first copy of the software;

receive, from the electronic device, a second copy of the software;

produce a second hash of the second copy of the software;

compare the first hash and the second hash;

send, in response to a result of a comparison between the first hash and the second hash being that the first hash does not match the second hash, a signal, the signal configured to prevent a result of an execution of the first copy of the software by the computer platform from being sent to the processor; and send, in response to the result of the comparison between the first hash and the second hash being that the first hash matches the second hash, a second signal, a second signal configured to cause the result of the execution of the first copy of the software by the first computer platform to be sent to the processor.

9. A first electronic device, comprising:

a memory configured to:

store a first hash of a first copy of the software, the first copy of the software having been received by a computer platform from a second electronic device, the computer platform configured to execute the first copy of the software;

store a second copy of the software;

store a second hash of the second copy of the software; and store a result of a comparison between the first hash and the second hash;

communications circuitry configured to:

receive, from the computer platform, the first hash;

receive, from the second electronic device, the second copy of the software;

send a signal, the signal configured to prevent a result of an execution of the first copy of the software by the computer platform from being sent to the first electronic device; and send a second signal, the second signal configured to the cause the result of the execution of the first copy of the software by the computer platform to be sent to the first electronic device; and a processor configured to:

produce the second hash of the second copy of the software;

compare the first hash and the second hash;

cause the communication circuitry to send, in response to the result of the comparison between the first hash and the second hash being that the first hash does not match the second hash, the signal; and cause the communication circuitry to send, in response to the result of the comparison between the first hash and the second hash being that the first hash matches the second hash, the second signal; and a bus configured to facilitate communication among the memory, the communication circuitry, and the processor.

10. A method for verifying a sequence of instructions of a software, comprising:

receiving, at a first computer platform from a first electronic device, a first copy of the software, the first computer platform configured to execute the first copy of the software;

producing, at the first computer platform, a first hash of the first copy of the software;

receiving, at the first computer platform from a second electronic device, a second hash of a second copy of the software, the second copy of the software having been received by the second electronic device from the first electronic device;

comparing, at the first computer platform, the first hash and the second hash;

sending, from the first computer platform and in response to a result of a comparison between the first hash and the second hash being that the first hash does not match the second hash, a first signal, the first signal including an indication that a result of an execution of the first copy of the software by the first computer platform will not be transmitted; and further comprising sending, from the first computer platform and in response to the result of the comparison between the first hash and the second hash being that the first hash matches the second hash, a second signal, the second signal including an indication that the result of the execution of the first copy of the software by the first computer platform will be transmitted to the second electronic device.

11. The method of claim 10, wherein the sending the first signal comprises sending the first signal to the second electronic device.

12. The method of claim 10, wherein the sending the first signal comprises sending the first signal to the first electronic device, the first signal configured to cause the first electronic device to send a second signal to the second electronic device.

13. The method of claim 10, wherein the indication that the result of the execution of the first copy of the software by the first computer platform will not be transmitted comprises an indication that the result of the execution of the first copy of the software by the first computer platform will not be transmitted to the second electronic device.

14. The method of claim 10, wherein the indication that the result of the execution of the first copy of the software by the first computer platform will not be transmitted comprises an indication that the result of the execution of the first copy of the software by the first computer platform will not be transmitted to a third electronic device.

15. The method of claim 10, further comprising sending, from the first computer platform and in response to the result of the comparison between the first hash and the second hash being that the first hash matches the second hash, a second signal, the second signal including an indication that the result of the execution of the first copy of the software by the first computer platform will be transmitted to a third electronic device.

16. The method of claim 10, wherein the software includes an implementation of at least a portion of an act associated with an agreement between at least two entities.

17. A non-transitory computer-readable medium storing computer code for controlling a processor to cause the processor to verify a sequence of instructions of a software, the computer code including instructions to cause the processor to:

receive, from a first electronic device, a first copy of the software, the computer platform configured to execute the first copy of the software;

produce a first hash of the first copy of the software;

receive, from a second electronic device, a second hash of a second copy of the software, the second copy of the software having been received by the second electronic device from the first electronic device;

compare the first hash and the second hash;

send, in response to a result of a comparison between the first hash and the second hash being that the first hash does not match the second hash, a signal, the signal including an indication that a result of an execution of the first copy of the software by the computer platform will not be sent to the second electronic device; and send, in response to the result of the comparison between the first hash and the second hash being that the first hash matches the second hash, a second signal, the second signal including an indication that the result of the execution of the first copy of the software by the first computer platform will be sent to the second electronic device.

18. A computer platform, comprising:

a memory configured to:
store a first copy of the software, the computer platform configured to execute the first copy of the software;
store a first hash of the first copy of the software;
store a second hash of a second copy of the software, the second copy of the software having been received by a first electronic device from a second electronic device; and
store a result of a comparison between the first hash and the second hash;

communications circuitry configured to:
receive, from the second electronic device, the first copy of the software;
receive, from the first electronic device, the second hash;
send a signal, the signal including an indication that a result of an execution of the first copy of the software by the computer platform will not be sent to the first electronic device; and
send a second signal, the second signal including an indication that the result of the execution of the first copy of the software by the computer platform will be sent to the first electronic device;

a processor configured to:
produce the first hash of the first copy of the software;
compare the first hash and the second hash;
cause the communication circuitry to send, in response to the result of the comparison between the first hash and the second hash being that the first hash does not match the second hash, the signal;
cause the communication circuitry to send, in response to the result of the comparison between the first hash and the second hash being that the first hash matches the second hash, the second signal; and a bus configured to facilitate communication among the memory, the communication circuitry, and the processor.

* * * * *